United States Patent [19]

Takashima

[11] Patent Number: 5,757,520
[45] Date of Patent: May 26, 1998

[54] COLOR LINEAR IMAGE SENSOR AND AN IMAGE PROCESSING SYSTEM

[75] Inventor: Izumi Takashima, Ebina, Japan

[73] Assignee: Fuji Xerox Co., Ltd., Tokyo, Japan

[21] Appl. No.: 570,526

[22] Filed: Dec. 11, 1995

[30] Foreign Application Priority Data

Dec. 13, 1994 [JP] Japan .................................. 6-308615
Nov. 16, 1995 [JP] Japan .................................. 7-298070

[51] Int. Cl.$^6$ .................................................. H04N 1/46
[52] U.S. Cl. .......................... 358/513; 358/505; 358/482; 250/200; 348/294
[58] Field of Search .................................. 358/512, 513, 358/505, 515, 482, 483; 348/266, 268, 272, 273, 280, 294; 250/200, 208.1, 208.3

[56] References Cited

U.S. PATENT DOCUMENTS

| | | | |
|---|---|---|---|
| 3,822,362 | 7/1974 | Weckler et al. | 348/294 |
| 4,500,914 | 2/1985 | Watanabe et al. | 348/280 |
| 5,031,032 | 7/1991 | Perregaux et al. | 358/513 |

FOREIGN PATENT DOCUMENTS 59-181568  10/1984  Japan.
2-254865   10/1990  Japan.

OTHER PUBLICATIONS

Kawamoto et al. "CCD Linear Sensor Employing High-Speed Driving Dot Sequential Color Method." The Journal of the Institute of Television Engineers of Japan, vol. 47, No. 9, pp. 1162–1167.

Mita et al., "Color Filter Technology for CCD Image Sensors", Toshiba Review, 1988, vol. 43, No. 7, pp. 548–550.

Primary Examiner—Thomas D. Lee
Attorney, Agent, or Firm—Oliff & Berridge

[57] ABSTRACT

A color linear image sensor includes a sensor pixel linear array with a plural number of color filters laid and bonded thereover, a readout circuit and an output processing circuit. The sensor pixel linear array consists of repeat patterns of color pixels linearly arrayed in a preset color order, the repeat patterns being symmetrical with respect to the midpoint of the sensor pixel linear array. The readout circuit reads out image signals line by line from the sensor pixel linear array. The output processing circuit distributes the readout signals into a plural number of color image signal routes, and outputs the readout signals of separated colors. The color linear image sensor thus constructed may be incorporated into an image processing system. The midpoint of the sensor pixel linear array is coincident with the optical axis of a lens of the optical system of the image processing system.

15 Claims, 25 Drawing Sheets

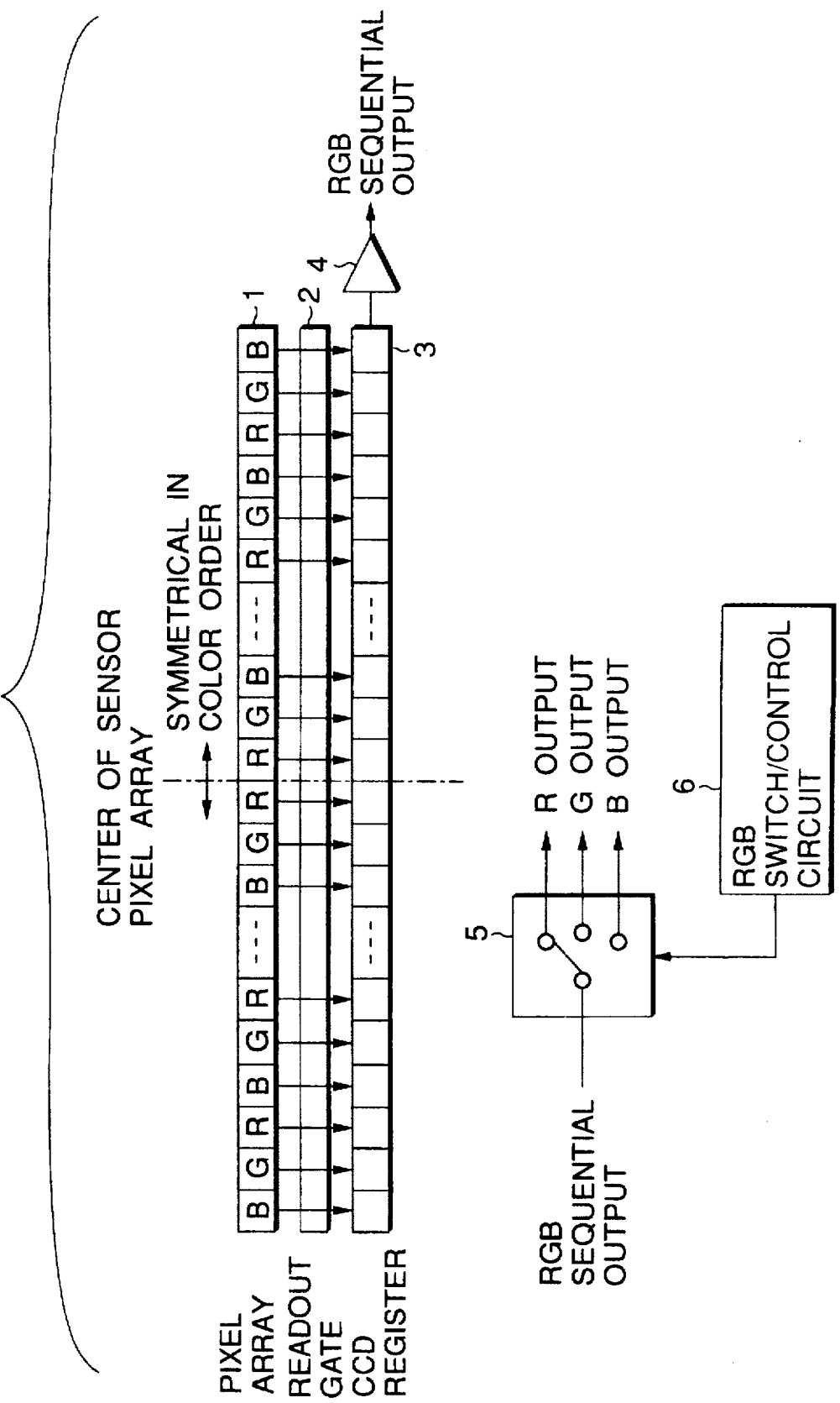

FIG.2A
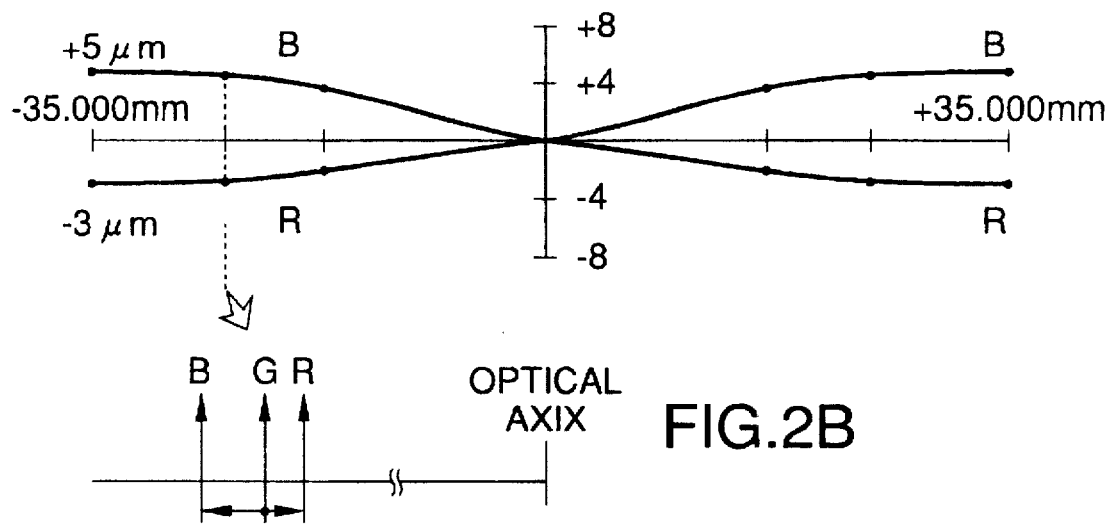
FIG.2B
FIG.3A
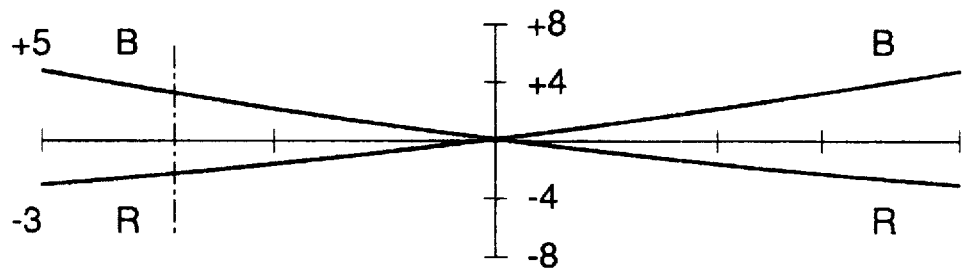
FIG.3B
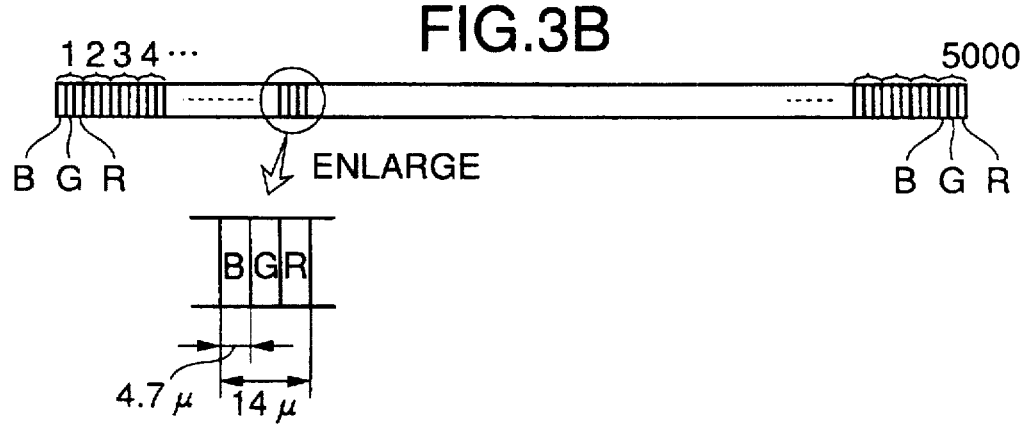

COLOR LINEAR IMAGE SENSOR AND AN IMAGE PROCESSING SYSTEM

BACKGROUND OF THE INVENTION

1. Field of the Invention

The present invention relates to a color linear image sensor which consists of a sensor pixel linear array consisting of a repeat pattern of color pixels linearly arrayed in a preset color order, reads out image information from an original document, and produces the result of the image readout in the form of image signals of separated colors. The invention also relates to an image processing system using the color linear image sensor.

2. Discussion of the Prior Art

FIG. 24 is a diagram showing an arrangement of a conventional dot-sequential color linear image sensor of 1-line type. FIG. 25 is a diagram showing an arrangement of another conventional dot-sequential color linear image sensor of 1-line type. FIG. 26 is a diagram showing an arrangement of the innards of a chip of the dot-sequential 1-line color linear image sensor of FIG. 25. FIG. 27 is a timing chart showing an operation of the sensor chip innards arranged as shown in FIG. 26. FIG. 28 is a block diagram showing an arrangement of a video signal processing circuit of a 3-line color linear image sensor.

A CCD linear sensor is used for an image reader for reading an image on an original document, which is incorporated into various machines used in offices, such as copying machines, facsimile machines, and scanners. To use the CCD linear sensor for reading out a color image from an original document, it is modified into a color linear image sensor in which a color filter having spectral sensitivities of R (red), G (green) and B (blue) is laid over the CCD linear sensor chip.

Conventionally, a dot-sequential 1-line color linear image sensor, which is constructed with the combination of a 100% size, contact type image sensor and a rod lens array, is used for reading out a color image. In this sensor, the pixel size of the sensor is large, and hence the S/N performance thereof is good. In a case where an image on an original document of A3 size, for example, is read at 400 spi, a long sensor of 30 cm long must be used since the sensor is of the 100% size type. It is difficult to manufacture such a long sensor by one chip. Therefore, it is necessary to combine five sensor chips each of, for example, 60 mm long for reading out the image of A3 size. Therefore, the sensor and drive/signal processing circuits for the sensor are expensive. Color difference is inevitably caused among the chips. Further, an unsatisfactory focal depth is secured since it is combined with the rod lens array.

To remove those defects, another image sensor system is proposed. The image sensor system is constructed with the combination of a line-sequential 3-line color linear image sensor of the reduction type and a spherical lens. The image sensor system is advantageous in that the chip size is small, no difference among chips exists since it is constructed with one chip, and cost to manufacture is low. However, the image sensor system is disadvantageous in that, as shown in FIG. 28, a gap correction in the slow scan direction is required, and that vibrations caused by a scan motor and others make it difficult to secure a necessary accuracy of the gap correction. To solve the problem of the slow-scan directional gap correction, there is proposed a dot-sequential color linear image sensor of 1-line type.

In the 3-line color linear image sensor, line gaps are indispensably present among the R, G and B line sensors. Therefore, the line-to-line gap correction is required. The dot-sequential 1-line color linear image sensor is superior to the 3-line color linear image sensor in that the former requires no line-to-line gap, but is inferior to the latter in that the colors of R, G and B are displaced in the fast scan direction. The dot-sequential 1-line color linear image sensor sometimes uses the shift averaging operation to correct the color displacement. The shift averaging operation impairs the MTF, however.

Thus, the conventional color linear image sensor may be categorized into the 3-line color linear image sensor (FIG. 28), and the dot-sequential 1-line color linear image sensors (FIG. 24 and 25). As described above, in the 3-line color linear image sensor, the sensor pixel linear arrays having the color filters of R, G and B spectral sensitivities are arranged parallel to each other in the slow scan direction. In the dot-sequential 1-line color linear image sensor of FIG. 24, the sensor pixel linear array 91 is constructed such that pixel groups each consisting of R, G and B color pixels linearly arrayed in this order are repeatedly and linearly arrayed. Accordingly, the color pixels form a repeat pattern of RGB, RGB, . . . , as shown. Readout signals are serially lead out in the order of color pixels thus arrayed, through a CCD register 93. In the dot-sequential 1-line color linear image sensor of FIG. 25, the sensor pixel linear array 91 is constructed as in the FIG. 24 sensor. The readout signals of R, G and B colors are transferred to CCD registers 93R, 93G, and 93B, respectively. Then, the CCD registers 93R, 93G, and 93B serially output color readout signals of R, G and B, respectively.

In the dot-sequential 1-line color linear image sensor of FIG. 24, a driver 95 responds to a pulse signal $\phi$ROG, and controls a readout gate 92 so that signals derived from the sensor pixel linear array 91 are simultaneously transferred in parallel to the CCD register 93. These readout signals, temporarily stored in the register, are serially outputted in the form of an output signal Vout from an output amplifier 94, under control of clock signals $\phi$1 and $\phi$2, and a reset pulse signal $\phi$RS. The interior parts of the chip of the dot-sequential 1-line color linear image sensor shown in FIG. 25 are arranged as shown in FIG. 26 (Reference is made to a paper entitled "High Speed Driven Dot-Sequential Color CCD Linear Sensor" in The Journal of The Institute of Television Engineers of Japan, Vol. 47, No. 9, pp1162 to 1167.). A timing chart showing the operation of the FIG. 26 circuit is shown in FIG. 27. As seen from FIG. 27, the driver 95 responds to pulse signals $\phi$ROG(R), (G) and (B) and controls the readout gate 92. The signals from the sensor pixel linear array 91 are transferred to and temporarily stored in the CCD registers 93R, 93G and 93B. In response to clock signals $\phi$1 to $\phi$4, a timing generator 99 and a clock driver 96 drive the CCD registers 93R, 93G and 93B, so that the signals are read out of these registers and outputted through the output amplifier 94 in the form of the output signal Vout (R, G, B).

In the 3-line color linear image sensor, as shown in FIG. 28, the light reflected from a color original document is decomposed into light of three colors R, G and B, and those color signals are transformed into color video signals R, G and B. Each of these video signals is divided into two pixels signals, odd-numbered pixel signals (ODD) and even numbered pixels signals (EVEN). A video signal processing circuit includes sample/hold circuits 202, automatic gain control circuits 203, automatic offset control circuits 204, A/D converters 205, multiplexers 206, gap correction memories 207 and 207', and shading correction circuits 208. Analog vide signals from each 3-line color linear image sensor 201 are sampled and held, gain-adjusted, and offset-adjusted, and converted into digital signals. The even- and odd-numbered digital signals are mixed, and are processed for the gap correction and the shading correction. The gap correction memories 207 and 207' are provided for correcting the gaps among the sensors of R, G and B. The memories are FIFO line memories.

FIG. 29 is a diagram schematically showing an optical system of a document reader of the reduction type.

As shown, in the document reader, a spherical lens 252 is located between an original document 251 and a sensor 241. A chromatic aberration of magnification is caused since the refractive index of the material of the spherical lens 252, such as glass or plastic, varies depending on the colors (wavelengths) of light. Because of the chromatic aberration inherent to the spherical lens 252, the colors are displaced in the fast scan direction on the image projected on the sensor. The color displacement is symmetrical with respect to the optical axis. A specific example of the color displacement is shown in FIG. 2. The color displacement is symmetrical with respect to the optical axis in the optical system. As shown, at points ±35.000 mm on both sides of the optical axis an image of color R is displaced inward by 3 μm with respect to an image of color G, while an image of color B is displaced outward by 5 μm with respect to the same. In the wavelength, the color of B is shorter than the color of G, and the color of G is shorter than the color of R. The refractive index thereof is high. Therefore, the images of B, G and R are formed in this order from outside to inside. In the case of the dot-sequential 1-line color linear image sensor, the color displacement is unidirectionally fixed. Because of this, it is impossible to reduce the sum of quantities of the color displacement of the sensor and the lens on the right and the left sides (with respect to the optical axis) as shown in FIG. 4.

The positions of the R, G and B colors are displaced by a distance of ⅓ pixel. If the order of the arranged colors by the chromatic aberration of the spherical lens is the same as that of the colors arranged by the sensor, the color displacement is equal to the difference between the quantities of the color displacement of the spherical lens and the sensor. The order of the arranged colors is invariable over the range from one end of the sensor to the other end thereof. Accordingly, on the other side with respect to the optical axis, the order of the arranged colors by the chromatic aberration of the spherical lens is reverse to that of the arranged colors of the sensor. The quantity of the color displacement is equal to the sum of the quantities of the color displacement by the spherical lens and the sensor. In a sensor consisting of pixels arrayed at pitches of 14 μm, for example, the position displacement of the pixels is approximately 4.7 μm (14/3≈4.7 μm). Therefore, at one end of the sensor the quantity of the color displacement of the R image is +1.7 μm and that of the B image is −0.3 μm, while at the other end, the quantity of the color displacement of the image of the color R is −7.7 μm, and that of the image of the color B is +9.7 μm. Thus, the quantity of the color displacement gradually increases from one side of the sensor to the other side.

A device for correcting the color displacement in the color sensor is disclosed in Published Unexamined Japanese Patent Application No. Hei. 2-254865. The disclosed device carries out a correction process so as to match the phases of the center color components of the color displacement correction and the color component resulting from the color displacement correction with the MTF characteristic. The processing circuit complexity problem still exists in the disclosed device.

SUMMARY OF THE INVENTION

The present invention has been made in view of the above circumstances and has an object to provide a color linear image sensor which reduces the quantity of color displacement caused by the chromatic aberration of magnification of an optical system.

Another object of the present invention is to provide an image processing system using such a color linear image sensor.

According to the present invention, there is provided a color linear image sensor comprising: a sensor pixel linear array with a plural number of color filters laid and bonded thereover, the sensor pixel linear array consisting of repeat patterns of color pixels linearly arrayed in a preset color order, the repeat patterns being symmetrical with respect to the midpoint of the sensor pixel linear array; a readout circuit for reading out image signals line by line from the sensor pixel linear array; and an output processing circuit for distributing the readout signals into a plural number of color image signal routes, the output processing circuit outputting the readout signals of separated colors.

In the color linear image sensor, the order of the colors of the pixels in the sensor pixel linear array is made to match with the lens characteristic of the chromatic aberration of magnification, whereby minimizing the quantity of the color displacement in the fast scan direction. The color pixels of the sensor pixel linear array are arranged in the order of R (red), G (green) and B (blue) from the midpoint of the sensor pixel linear array toward the outside thereof. The color of G is located at the center of the trio of colors R, G and B in the sensor pixel linear array.

Further, only the color filters are symmetrically arranged for the sensor pixel linear array. A couple of sensor chips including the pixels arrayed in the same color order, are arranged linearly and side by side in a state that one chip is turned 180° with respect to the other chip. The output distribution circuit distributes the output signals of the readout circuit in accordance with the order of the colors arranged of the filters.

The color linear image sensor thus constructed may be incorporated into an image processing system. The midpoint of the sensor pixel linear array is coincident with the optical axis of a lens of the optical system of the image processing system.

In the color linear image sensor thus constructed, since the order of the colors of the arrayed pixels is symmetrical with respect to the midpoint thereof, a distortion of the image owing to the chromatic aberration of magnification in the optical system is reduced. A couple of sensor chips including the pixels arrayed in the same color order, are arranged linearly and side by side in a state that one chip is turned 180° with respect to the other chip. Therefore, it is easy to realize a color linear image sensor in which the order of the colors arranged of the pixels is symmetrical with respect to the midpoint thereof.

Further, a color linear image sensor can readily be realized in a manner that only the color filters are symmetrically arranged for the sensor pixel linear array, and the output distribution circuit distributes the output signals of the readout circuit in accordance with the order of the colors arranged of the filters.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 1 is a diagram showing a color linear image sensor according to an embodiment of the present invention;

FIG. 2a and FIG. 2b are a diagram use in explaining the chromatic aberration of magnification of a spherical lens;

FIG. 3a and FIG. 3b are a diagram showing a relationship of a spherical lens and position displacement of a dot sequential sensor;

DETAILED DESCRIPTION OF THE PREFERRED EMBODIMENTS

Figure 4:
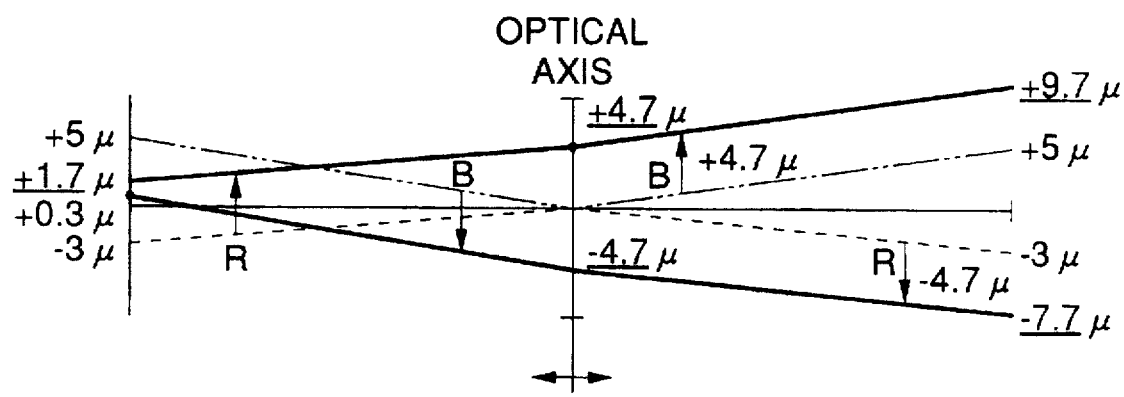
FIG. 4 is a diagram showing the quantities of the color displacement where a spherical lens is combined with a conventional dot sequential sensor.

The preferred embodiments of the present invention will be described with reference to the accompanying drawings.

FIG. 1 is a diagram showing a color linear image sensor according to an embodiment of the present invention. In the figure, reference numeral 1 designates a sensor pixel linear array 1; 2, a readout gate; 3, a CCD register; 4, an output amplifier; 5, an output distribution circuit 5; and 6, an RGB select/control circuit.

In FIG. 1, the sensor pixel linear array 1 is constructed such that a color filter of the spectral sensitivities of R (red), G (green), and B (blue) is laid over a CCD sensor. The sensor pixel linear array 1 produces color-separated readout signals. The sensor pixel linear array 1 includes the left half section and the right half section, which are parted at the midpoint of the linear array per se. The left half section of the sensor pixel linear array 1 includes trios each of B, G, and R color pixels that are repeatedly and linearly arrayed in this order over the entire range of the left half section from the left end to the right end. The right half section thereof includes trios each of R, G, and B color pixels that are repeatedly and linearly arrayed in this order over the entire range of the right half section from the left end to the right end. Thus, the color order in the left half section of the sensor pixel linear array 1 is symmetrical with that in the right half section. The readout signals outputted from the sensor pixel linear array 1 are transferred in parallel and temporarily stored in the CCD register 3. The readout signals are read out of the CCD register 3 serially or in a dot sequential fashion. The readout gate 2 is used for controlling the parallel transfer of the readout signals from the sensor pixel linear array 1 to the CCD register 3. The R, G, and B color signals outputted from the CCD register 3 are sequentially amplified by the output amplifier 4. The output distribution circuit 5 separates the serial R, G and B color signals into R signals, G signals, and B signals, and distributes these separated color signals to their own routes. The RGB select/control circuit 6 controls the order of selecting the color signals for the distribution of the separated color signals in the output distribution circuit 5. In the present embodiment, the color order in the left half section of the sensor pixel linear array 1 is reverse to that in the right half thereof. For this reason, the selecting order is reversed at the midpoint of the sensor pixel linear array 1. If the color signals, which are derived from the first half section of the sensor pixel linear array 1 and arrive at the output distribution circuit 5, have a repeat pattern of B, G and R, then the color signals, which are derived from the second half and arrives at the output distribution circuit 5, have a repeat pattern of R, G and B. Accordingly, the RGB select/control circuit 6 controls the output distribution circuit 5 in conformity with the repeat patterns of the colors so that the output distribution circuit 5 separates the received color signals into individual color signals of R, G and B, and distributes the separated color signals to their own routes.

Figure 5:
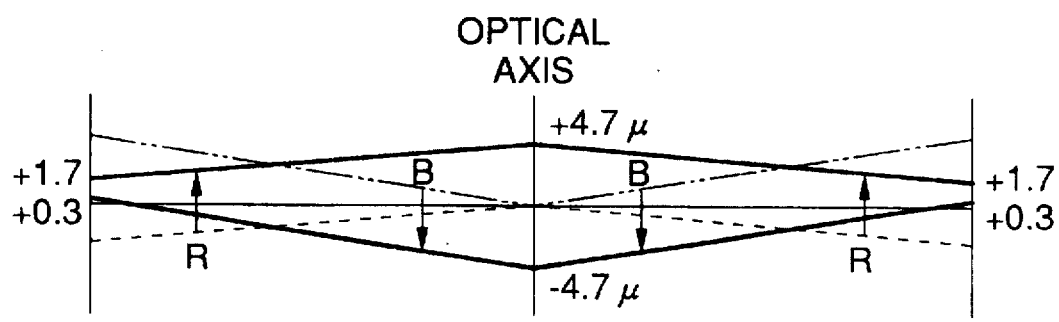
FIG. 5 is a diagram showing the quantities of the color displacement where a spherical lens is combined with a color linear image sensor of the present invention.

FIG. 2 is a diagram use in explaining the chromatic aberration of magnification of a spherical lens. FIG. 3 is a diagram showing a relationship of a spherical lens and position displacement of a dot sequential sensor. FIG. 4 is a diagram showing the quantities of the color displacement where a spherical lens is combined with a conventional dot sequential sensor. FIG. 5 is a diagram showing the quantities of the color displacement where a spherical lens is combined with a color linear image sensor of the present invention.

In the reduction type document reader with the color linear image sensor, a spherical lens is provided between an original document and the sensor. The chromatic aberration of magnification, which is inherent to the spherical lens, causes the colors to displace in the main scan direction on an image projected on the sensor. As shown in FIG. 2, the color displacement is symmetrical with respect to the optical axis in the optical system including the document, the spherical lens, and the sensor. As shown, at points ±35.000 mm on both sides of the optical axis an image of color R is displaced inward by 3 µm with respect to an image of color G, while an image of color B is displaced outward by 5 µm with respect to the same. In FIG. 3A, rectilinear lines are used for indicating the chromatic aberration of magnification of the spherical lens, for simplicity. A sensor pixel linear array having a repeat pattern of trios each consisting of color pixels of B, G and R linearly arrayed in this order, as of the conventional color linear image sensor of the reduction type, is illustrated in FIG. 3B in connection with FIG. 3A. As seen from the figures, it is impossible to reduce the quantities of the color displacement on both sides of the optical axis.

In the dot-sequential 1-line color linear image sensor, the positions of the R, G and B colors are displaced by a distance of ⅓ pixel. If the order of the arranged colors of the sensor, when viewed from the left side, is set to be reverse to that caused by the chromatic aberration of magnification of the spherical lens, the quantities of the color displacement are as shown in FIG. 4. As shown, on the left side of the optical axis, the quantity of the displacement of the color R is the difference between the color displacement quantity on the image sensor and the color displacement quality by the spherical lens (see the left side in FIG. 4). The same thing is true for the color B. The order of the arranged colors of the sensor is invariable over the entire length of the sensor from the left end to the right end. The order of the arranged colors of the sensor is the same as that caused by the chromatic aberration of magnification of the spherical lens on the right side of the optical axis. Therefore, on this side, the quantity of the displacement of the color B is the sum of the color displacement quantity on the image sensor and the color displacement quality by the spherical lens (see the right side in FIG. 4). The same thing is true for the color B. Where the pitch of the arrayed pixels of the sensor pixel linear array is 14 µm, the position displacement caused is approximately 4.7 µm (14/3≈4.7). Accordingly, on the right side of the optical axis, the quantity of the color displacement of the image of the color R is -7.7 µm and that of the image of the color B is +9.7 µm (FIG. 4), while the quantity of the color displacement of the color R is +1.7 µm and that of the image of the color B is +0.3 µm. Thus, the quantities of the color displacement of the colors are small on the left side of the optical axis, while the color displacement quantities are large on the right side. In other words, the color displacement quantities gradually grow from the left end to the right end. When the color linear image sensor of the present invention is used, the color displacement is symmetrical with respect to the optical axis as shown in FIG. 5. Further, the color displacement of the color images subtractively act, as on the left side in FIG. 4, whereby it is reduced.

Figure 6:
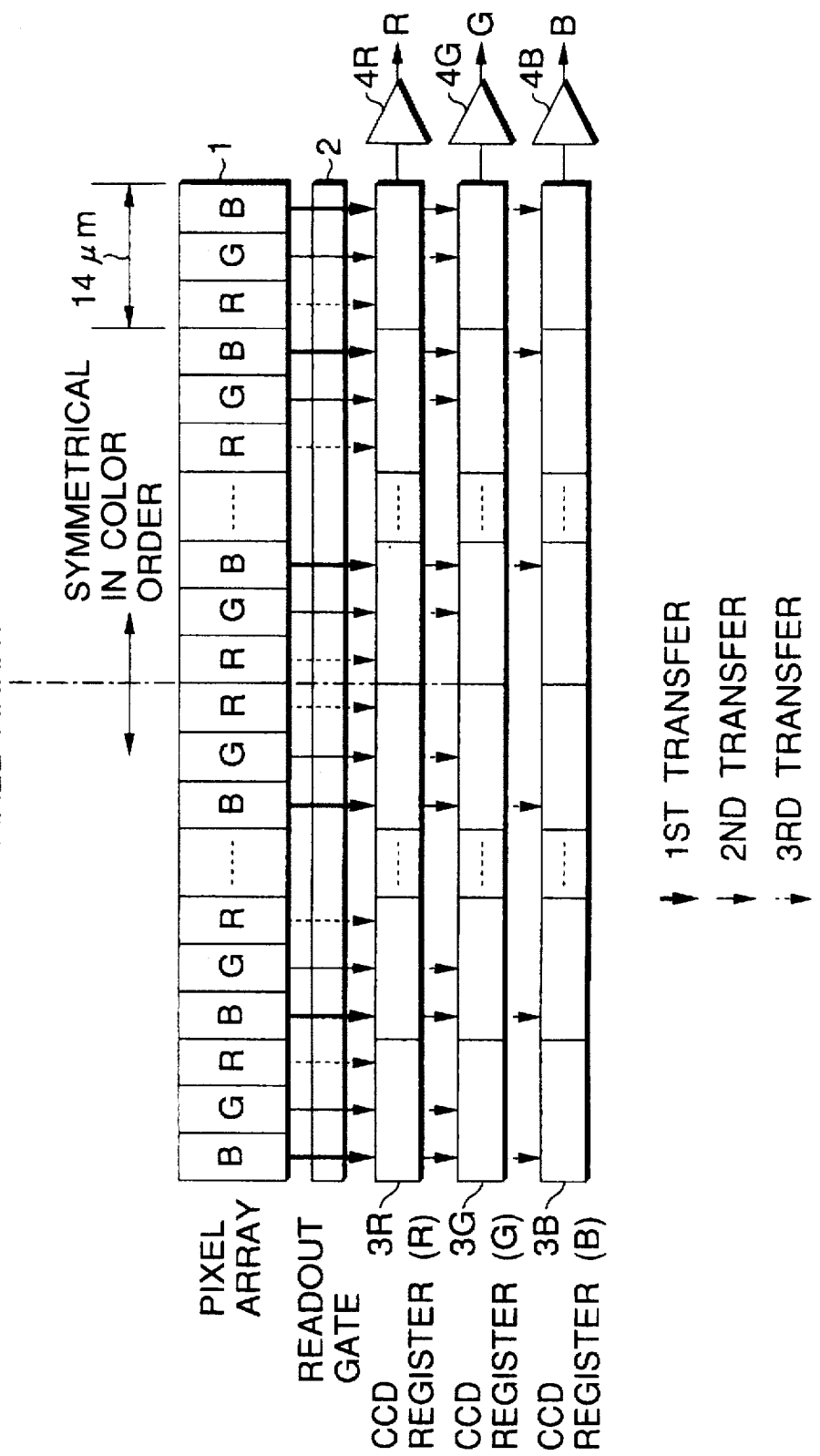
FIG. 6 is a diagram showing a color linear image sensor according to another embodiment of the present invention.

FIG. 6 is a diagram showing a color linear image sensor according to another embodiment of the present invention. As shown, one pixel segment of the sensor pixel linear array 1 is trisected. CCD registers 3R, 3G and 3B are assigned every color for each pixel segment. The readout signals are transferred in parallel to the CCD registers 3R, 3G and 3B. These registers serially output the read out signals for transfer to the output amplifiers 4R, 4G and 4B, which in turn produce output signals R, G and B. Accordingly, in the second embodiment, there is no need of using the output distribution circuit 5 and the RGB select/control circuit 6.

Figure 7:
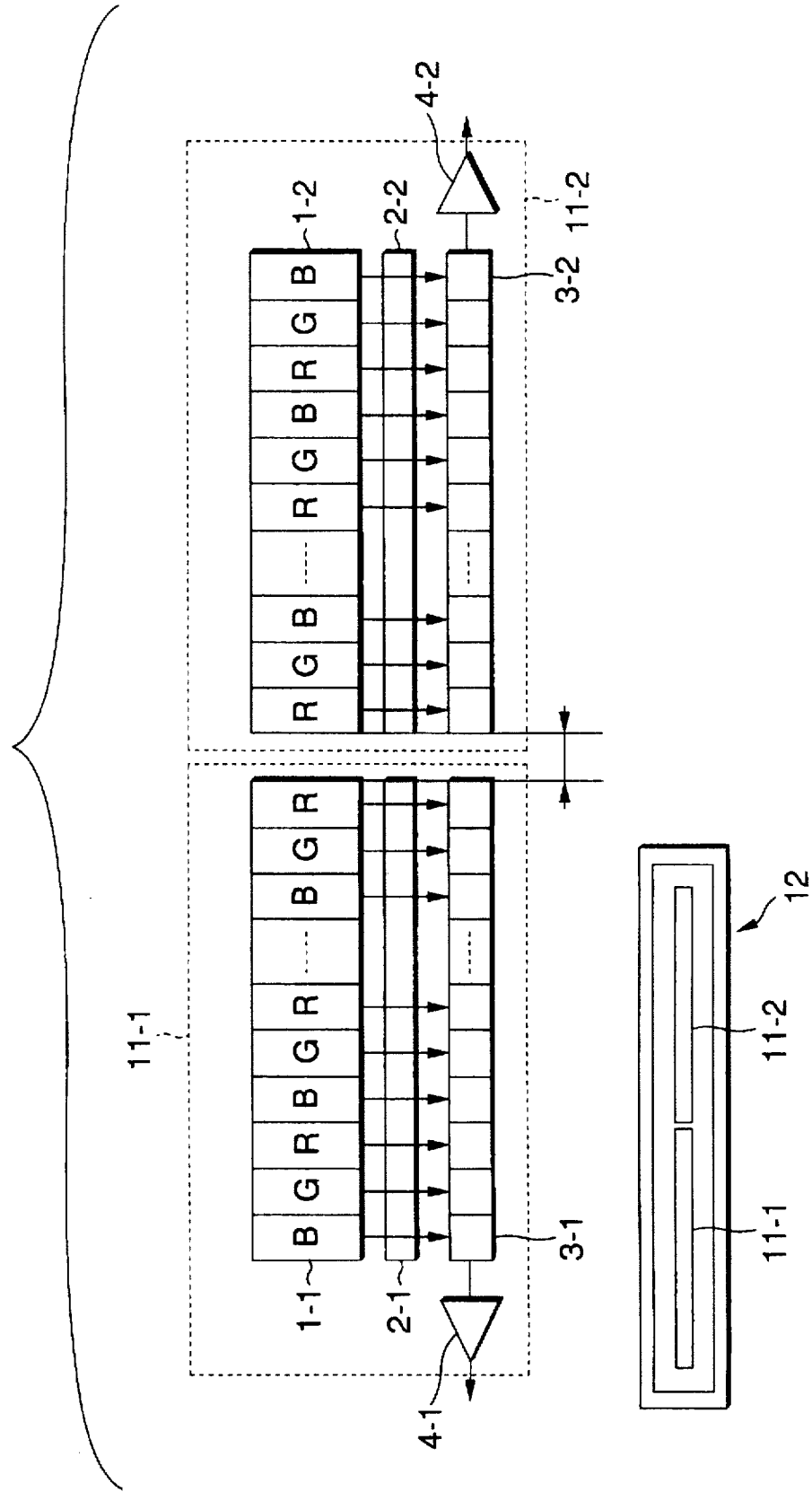
FIG. 7 is a diagram showing yet another embodiment of a color linear image sensor according to the present invention in which two types of chips of the color linear image sensors constructed as shown in FIG. 1 are combined.
Figure 8:
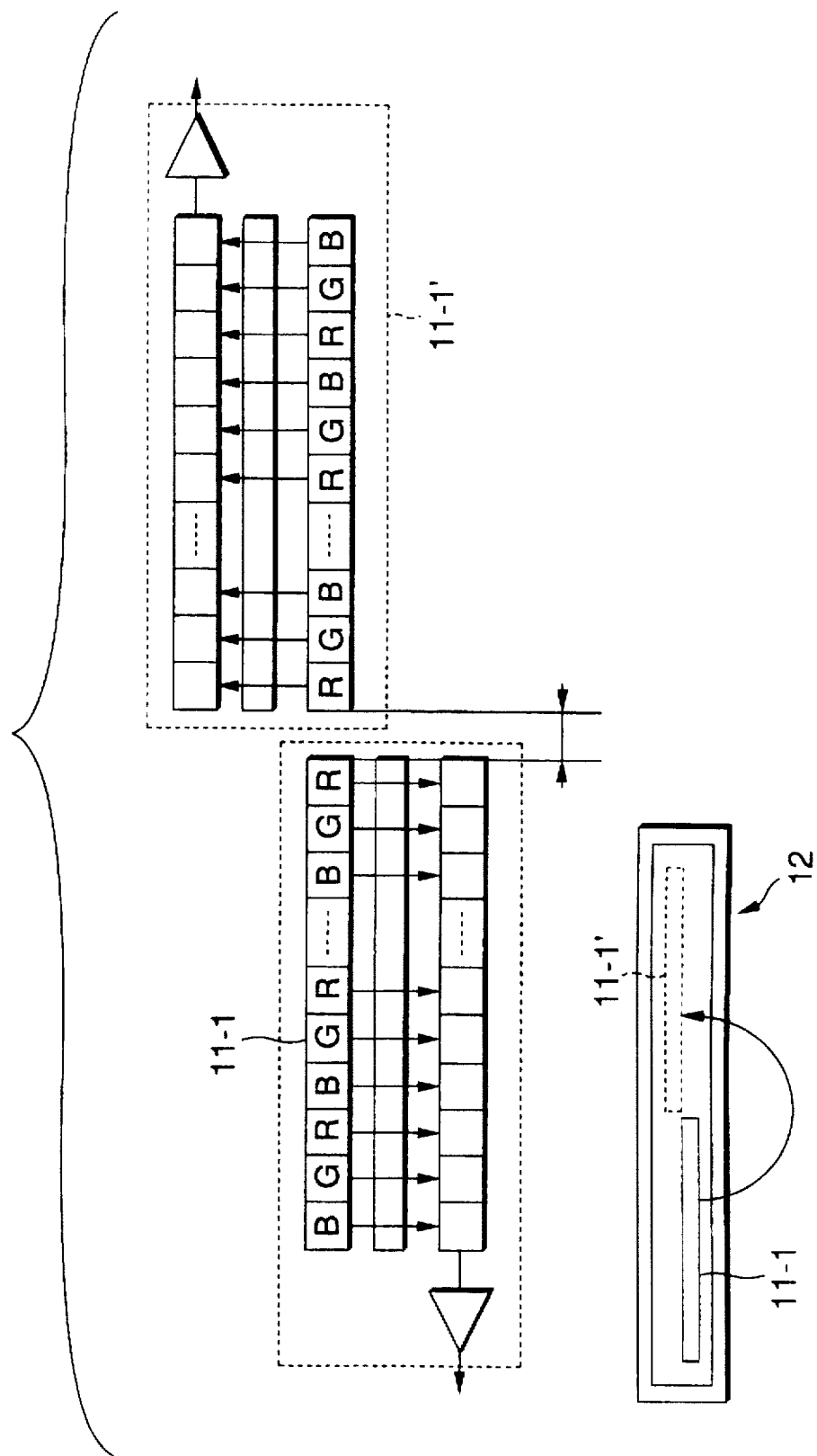
FIG. 8 is a diagram showing still another embodiment of a color linear image sensor according to the present invention in which two same type chips of the color linear image sensors constructed as shown in FIG. 1 are combined.
Figure 9:
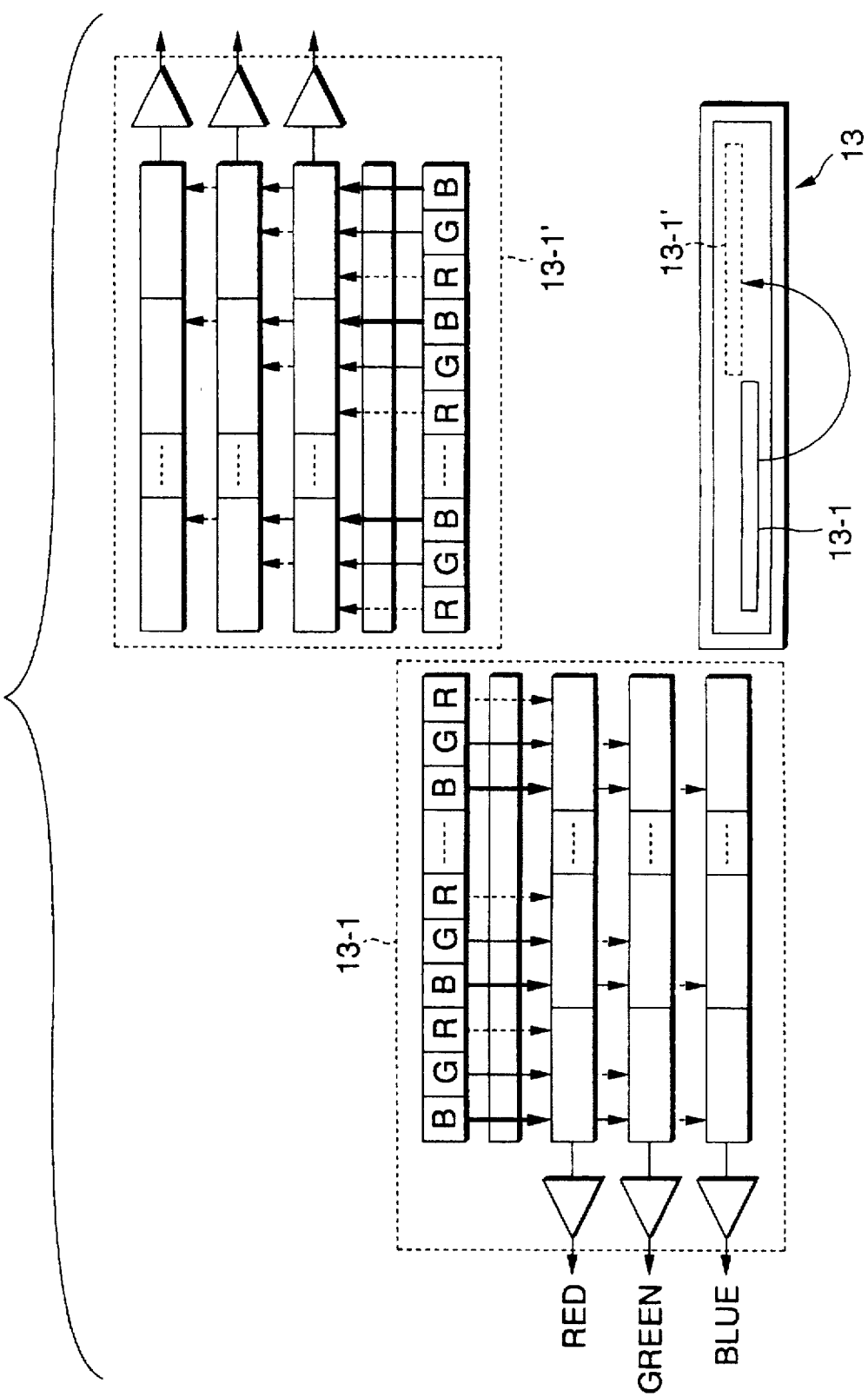
FIG. 9 is a diagram showing an additional embodiment of a color linear image sensor according to the present invention in which two same type chips of the color linear image sensors constructed as shown in FIG. 6 are combined.
Figure 10:
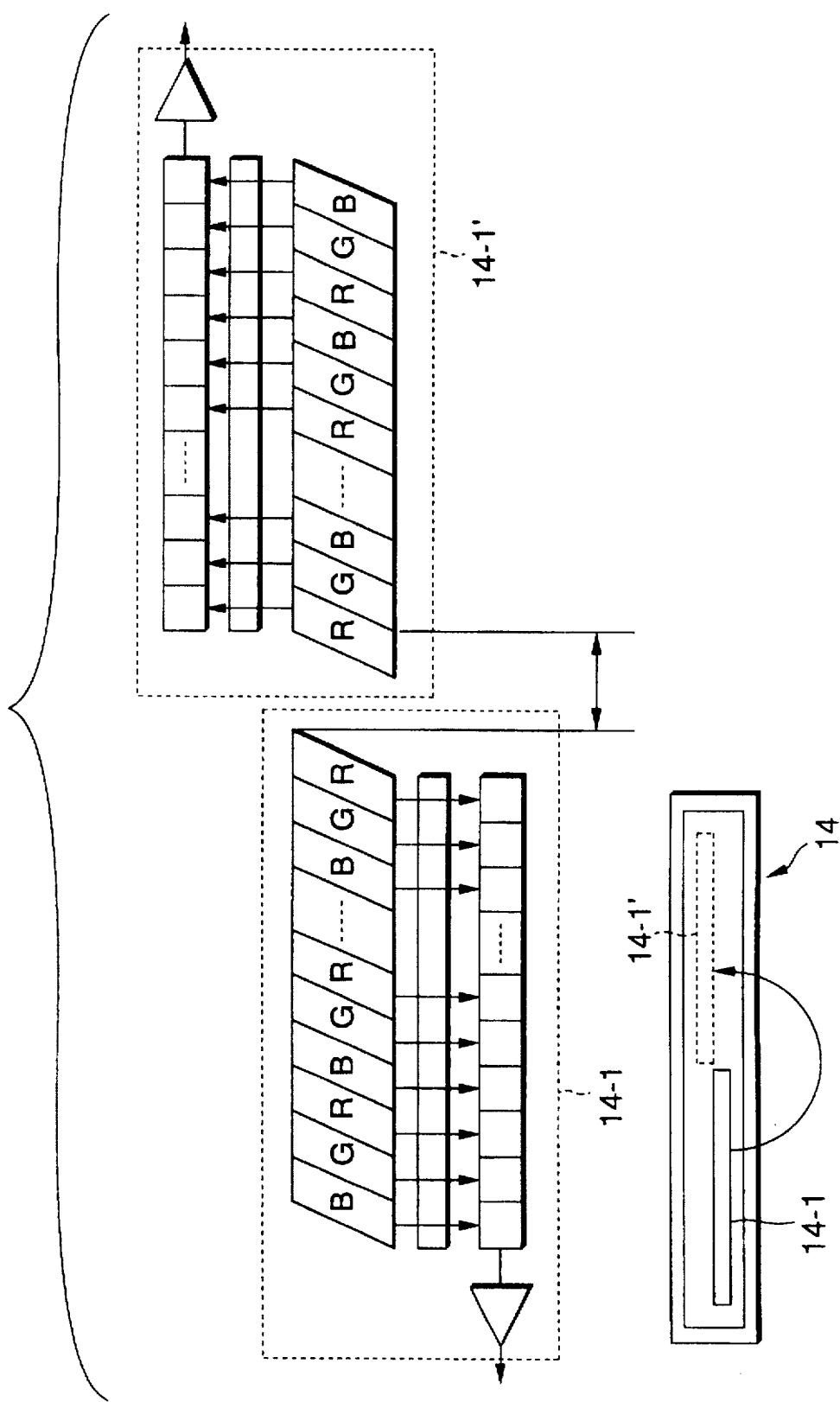
FIG. 10 is a diagram showing a further embodiment of a color linear image sensor according to the present invention in which pixels of the image sensor have parallelogram shape to reduce moire.

FIG. 7 is a diagram showing yet another embodiment of a color linear image sensor according to the present invention. In the embodiment, two types of chips of the color linear image sensors constructed as shown in FIG. 1 are combined. The interior constructions of these sensor chips are symmetrical in the order of the color pixels arranged in the sensor pixel linear array 1 and the arrangement of its related components. FIG. 8 is a diagram showing still another embodiment of a color linear image sensor according to the present invention. In the embodiment, two same type chips of the color linear image sensors constructed as shown in FIG. 1 are combined. FIG. 9 is a diagram showing an additional embodiment of a color linear image sensor according to the present invention. In the embodiment, two same type chips of the color linear image sensors constructed as shown in FIG. 6 are combined. FIG. 10 is a diagram showing a further embodiment of a color linear image sensor according to the present invention. In the embodiment, pixels of the image sensor have parallelogram shape to reduce moire.

To read an image on a document of A3 size at 400 spi, 5,000 pixels are used for the black/white image, and 15,000 pixels are used for the color image (three times as large as of the black/white image). To read it at 600 spi, viz., in a broad band/high resolution mode, 7,500 pixels are used for the black/white image, and 22,500 pixels are used for the color image. A considerably long sensor must be used, even if the size of one pixel is 5 µm. It is technically difficult to construct such a long sensor by one chip. In the embodiment of FIG. 7, two different types of sensor chips 11-1 and 11-2 are combined and packed into a sensor package 12. These sensor chips are symmetrical in the order of the arranged rectangular pixels in the sensor pixel linear array. In the embodiment of FIG. 8, two sensor chips 11-1 and 11-1' of the same construction shown in FIG. 1 are combined and arranged such that one chip is turned 180° with respect to the other in a state that the sensor pixel linear arrays 1 and 1' of those sensor chips are aligned with each other. Those chips 11-1 and 11-1' are packed into a sensor package 12. Two same type sensor chips with the CCDs of R, G and B colors are combined in the embodiment FIG. 9. Two same type sensor chips with slanted pixels are symmetrically combined in the embodiment FIG. 10. In this case, both the chips are arranged in line with each other. Further, the gap between the chips must be as small as possible.

Figure 11:
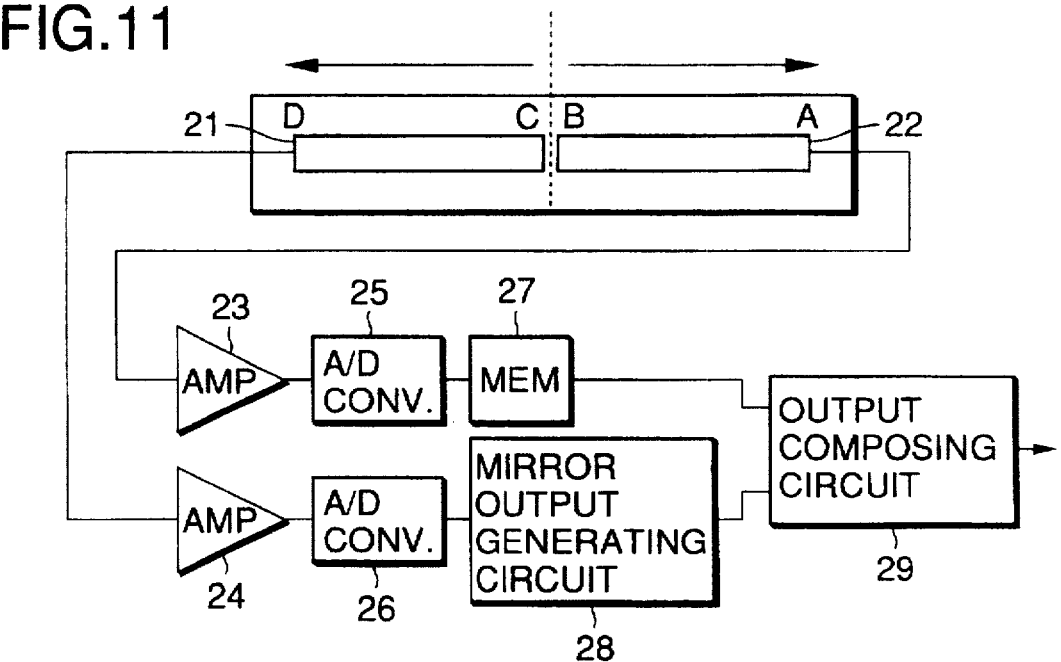
FIG. 11 is a block diagram showing a sensor output processing circuit.
Figure 12:
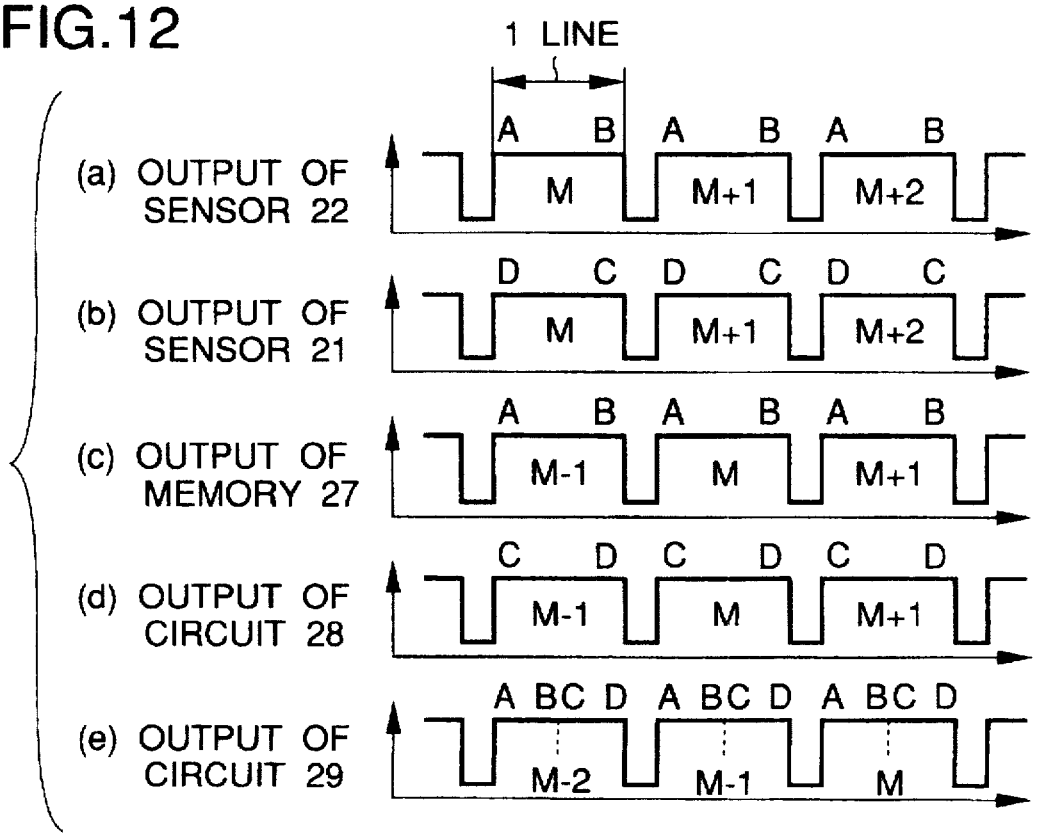
FIG. 12 is a timing chart showing the operation of the sensor output processing circuit shown in FIG. 11.
Figure 13:
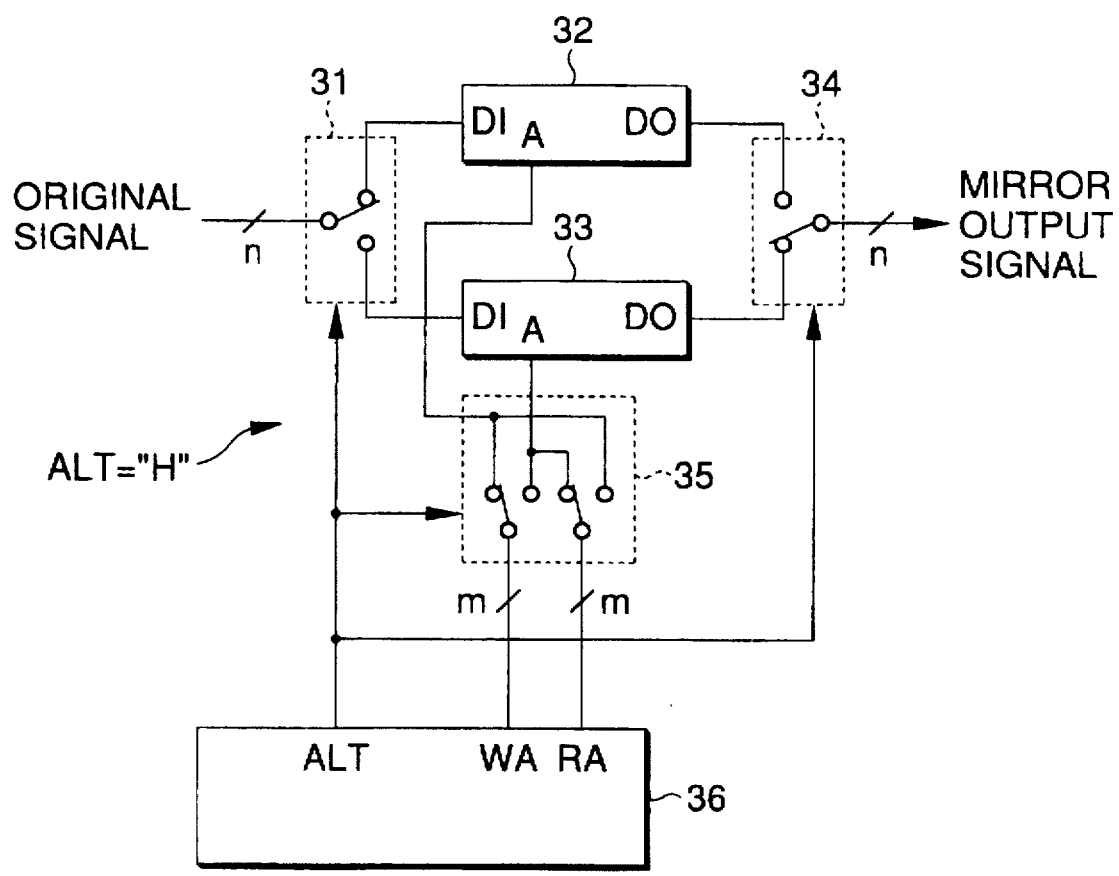
FIG. 13 is block diagram showing a mirror output generating circuit.
Figure 14:
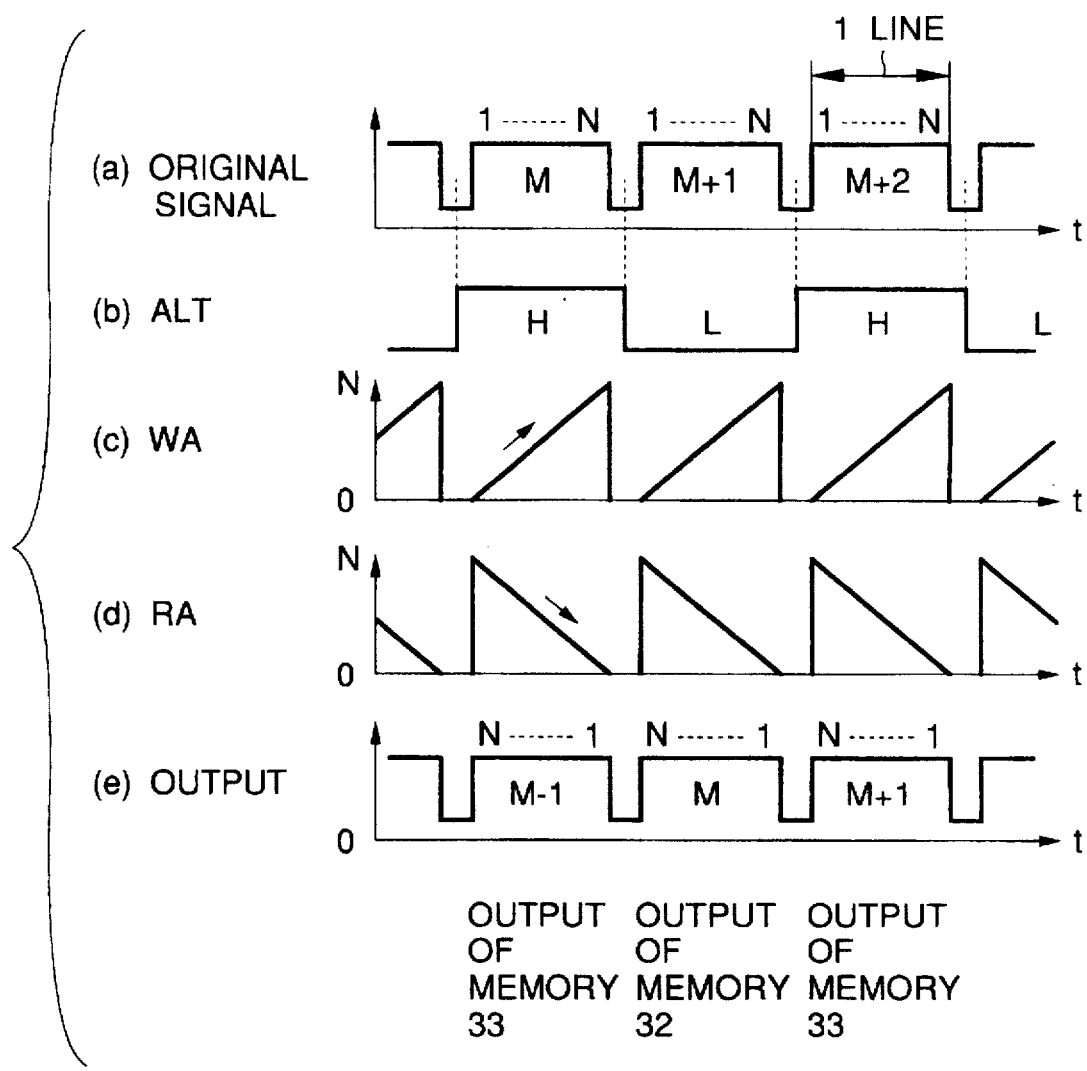
FIG. 14 is a timing chart showing the operation of the mirror output generating circuit of FIG. 13.
Figure 15:
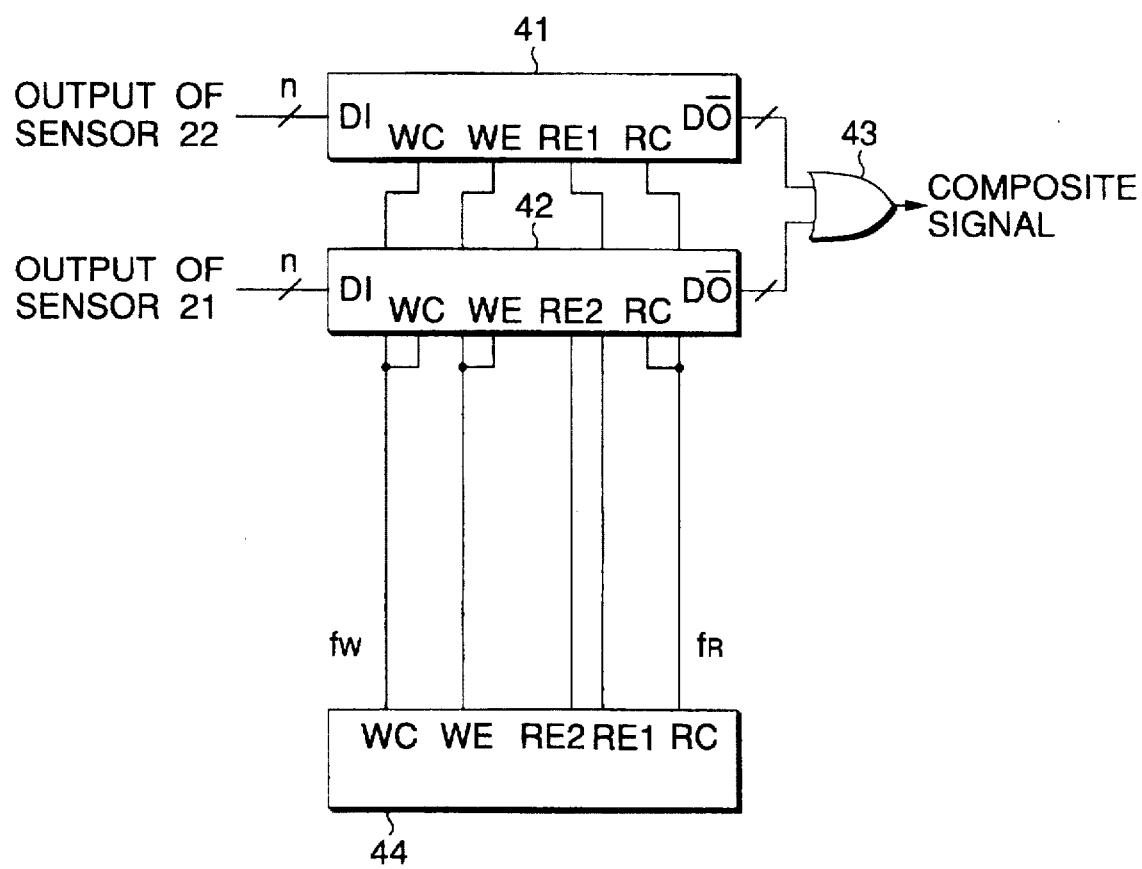
FIG. 15 is a block diagram showing an output composing circuit.
Figure 16:
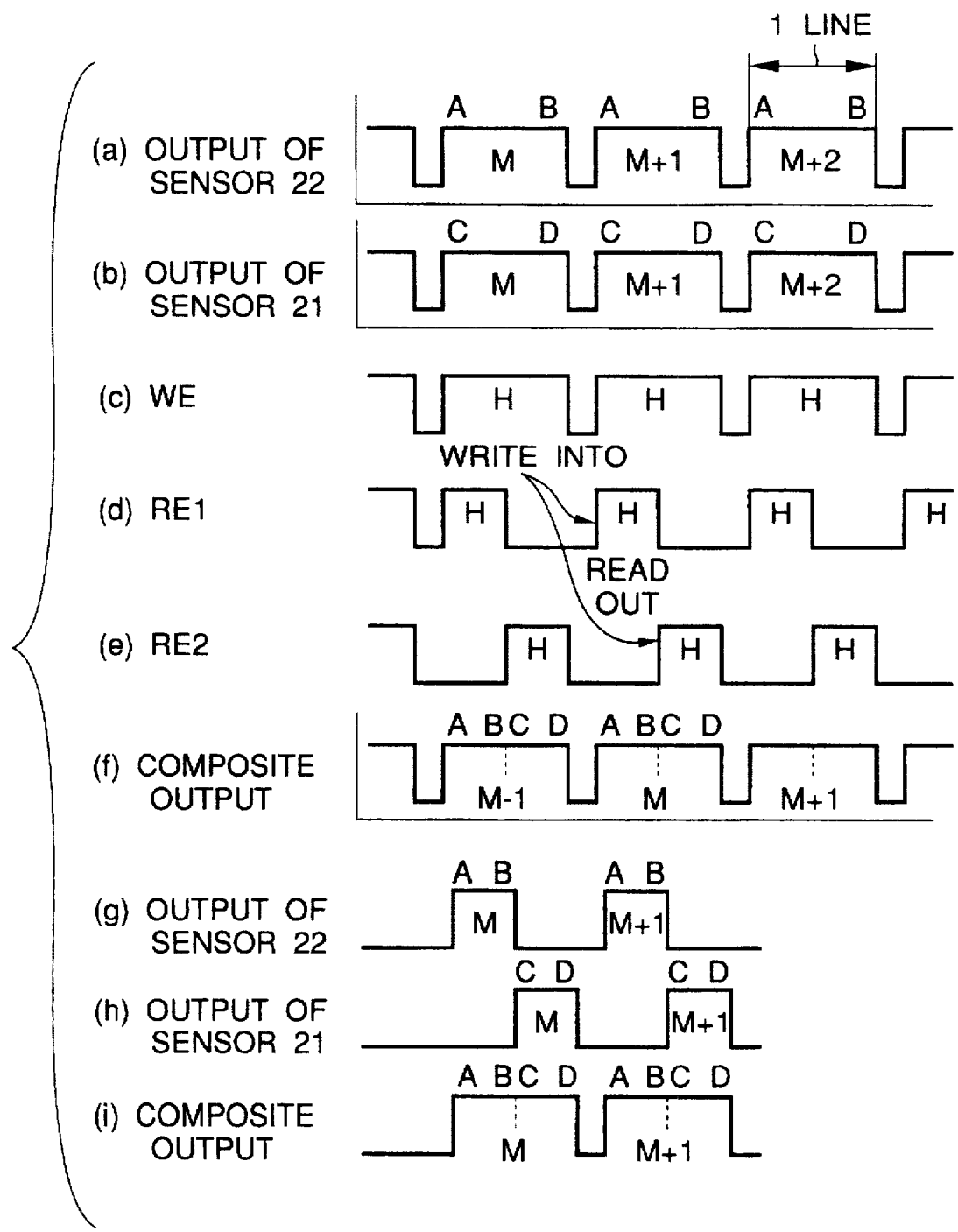
FIG. 16 is a timing chart showing the operation of the output composing circuit of FIG. 15.

FIG. 11 is a block diagram showing a sensor output processing circuit. FIG. 12 is a timing chart showing the operation of the sensor output processing circuit shown in FIG. 11. FIG. 13 is block diagram showing a mirror output generating circuit. FIG. 14 is a timing chart showing the operation of the mirror output generating circuit of FIG. 13. FIG. 15 is a block diagram showing an output composing circuit. FIG. 16 is a timing chart showing the operation of the output composing circuit of FIG. 15.

The sensor output processing circuit of FIG. 11 is coupled with the color linear image sensor constructed as shown in FIG. 8. In FIG. 11, from a sensor 21 image data is read out in the reverse direction, and from a sensor 22 image data is read out in the forward direction. The final readout directions are as shown. The output signals of the sensor 22 are amplified and applied to an A/D converter 25. From the A/D converter 25, image signals of R, G and B are dot-sequentially outputted in the forward direction A→B ((a) of FIG. 12). From the A/D converter 26, image signals of R, G and B are dot-sequentially outputted in the reverse direction D→C ((b) of FIG. 12). For the number of data pieces within each of the segments A→B and D→C, 5,000 pixels/line for each color when the document size of A4 is read out at 400 spi. The total number of pixels of R, G and B colors in one chip is 7500 pixels (=5000×3×½). A memory 27 delays the dot-sequential signals of R, G and B of A→B by the time of one line (chip) ((c) of FIG. 12). A mirror output generating circuit 28 inverts the direction of the dot-sequential signals of R, G and B from D→C to C→D and delays it by the time of one line ((d) of FIG. 12). The dot-sequential image signals outputted from the memory 27 and the mirror output generating circuit 28 are composed into the dot-sequential image signals of A→B→C→D by an output composing circuit 29 ((e) of FIG. 12). The output signals of the output composing circuit 29 are dot-sequential image signals of R, G and B. Accordingly, an RGB distributing circuit must be provided at the post stage of the output composing circuit 29. A shading correction circuit is also provided subsequent to it.

The mirror output generating circuit 28, as shown in FIG. 13, is made up of memories 32 and 33 for storing the R, G and B dot-sequential signals, switches 31 and 34 for switching the inputs and the outputs of the memories 32 and 33, a switch 35 for switching the addresses of the memories 32 and 33, and an address controller 36 for controlling the addresses of the memories 32 and 33 and the switches 31, 34 and 35. The mirror output generating circuit 28 thus constructed receives the mirror signals of the R, G and B dot-sequential signals at the switch 31 and outputs them at the switch 34. In the mirror output generating circuit 28, a readout address signal RA, which varies in the opposite direction (last in first out (LIFO)) with respect to a write address signal WA is produced by the address controller 36 ((c) and (d) of FIG. 14). In synchronism with this, a switch signal ALT ((b) of FIG. 14) is alternately inverted between logic levels H and L, thereby to switch the switches 31, 34 and 35. With the switching operation, data is written into and read out of the memories 32 and 33. Through the circuit operation, a mirror signal ((e) of FIG. 14) is generated from the original signal ((a) of FIG. 14). In the circuit of FIG. 13, n=8, m=13, and the memories 32 and 33 are each 64 k SRAM of 8 k×8 bits.

The output composing circuit 29, as shown in FIG. 15, is made up of memories (FIFOs) 41 and 42, an FIFO control circuit 44, and a composing circuit 43. The FIFO control circuit 44 produces a write enable signal WE ((c) of FIG. 16), and read enable signals RE1 and RE2 to control the read/write operation for the memories 41 and 42, whereby the sensor output signals ((a) and (b) of FIG. 16) are composed into a signal ((f) of FIG. 16). If the rate of reading out data from the sensors 21 and 22 is increased two times as shown in (g) and (h) of FIG. 16, the data may be jointed as shown in (i) of FIG. 16 without using the data rate-up means as mentioned above.

In the embodiments thus far made, the structure of the color filter and the black/white CCD sensor providing the undercolor are symmetrically constructed. It is very difficult to fabricate the CCD sensor so that it is symmetrical with respect to the midpoint thereof as shown in FIG. 6. A possible way to avoid the difficulty is to use the black/white CCD sensor as it is. The way of avoiding the difficulty may be implemented in the following ways.

Figure 17:
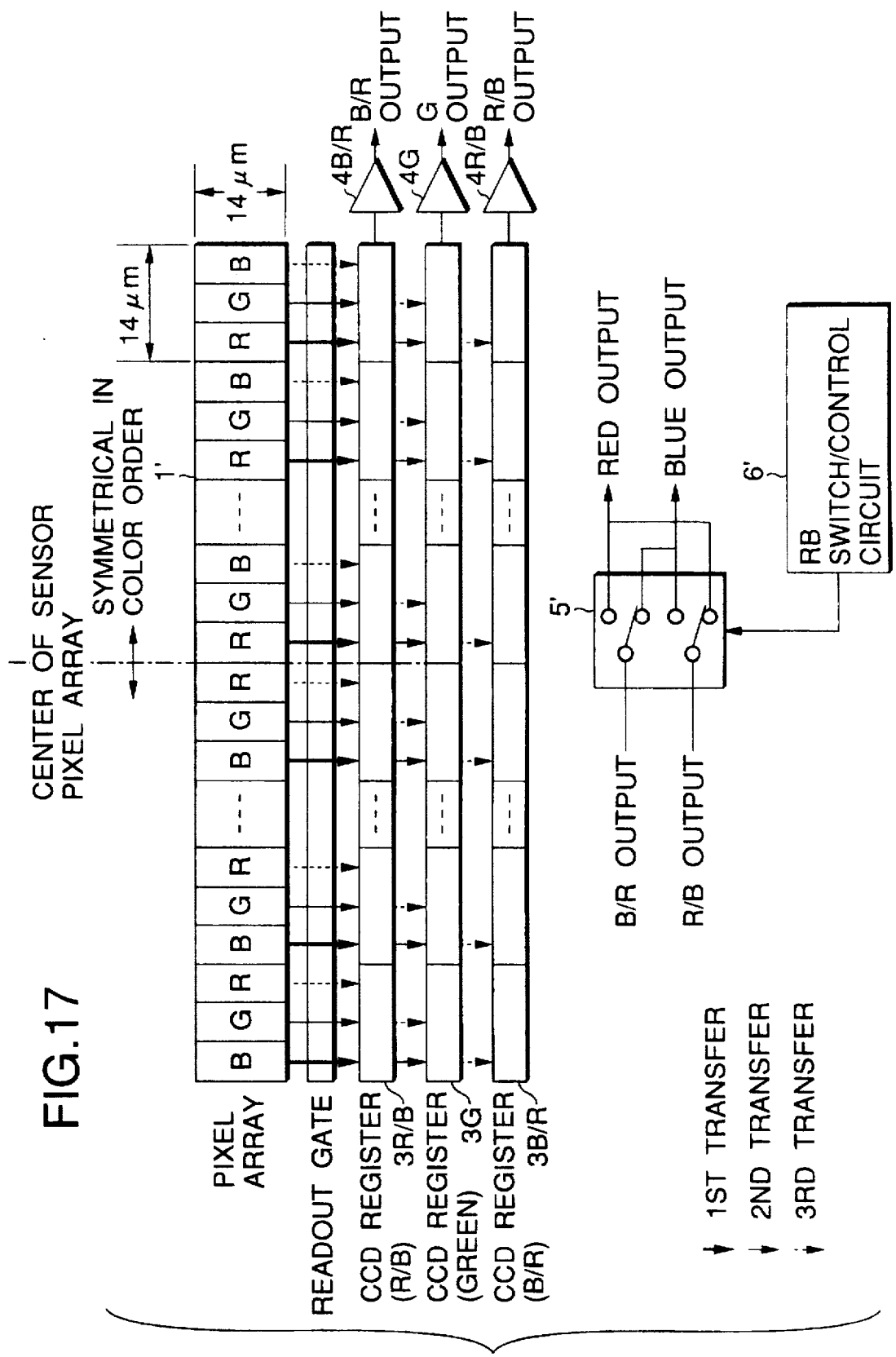
FIG. 17 is a block diagrams showing an additional embodiment of a color linear image sensor according to the present invention.
Figure 18:
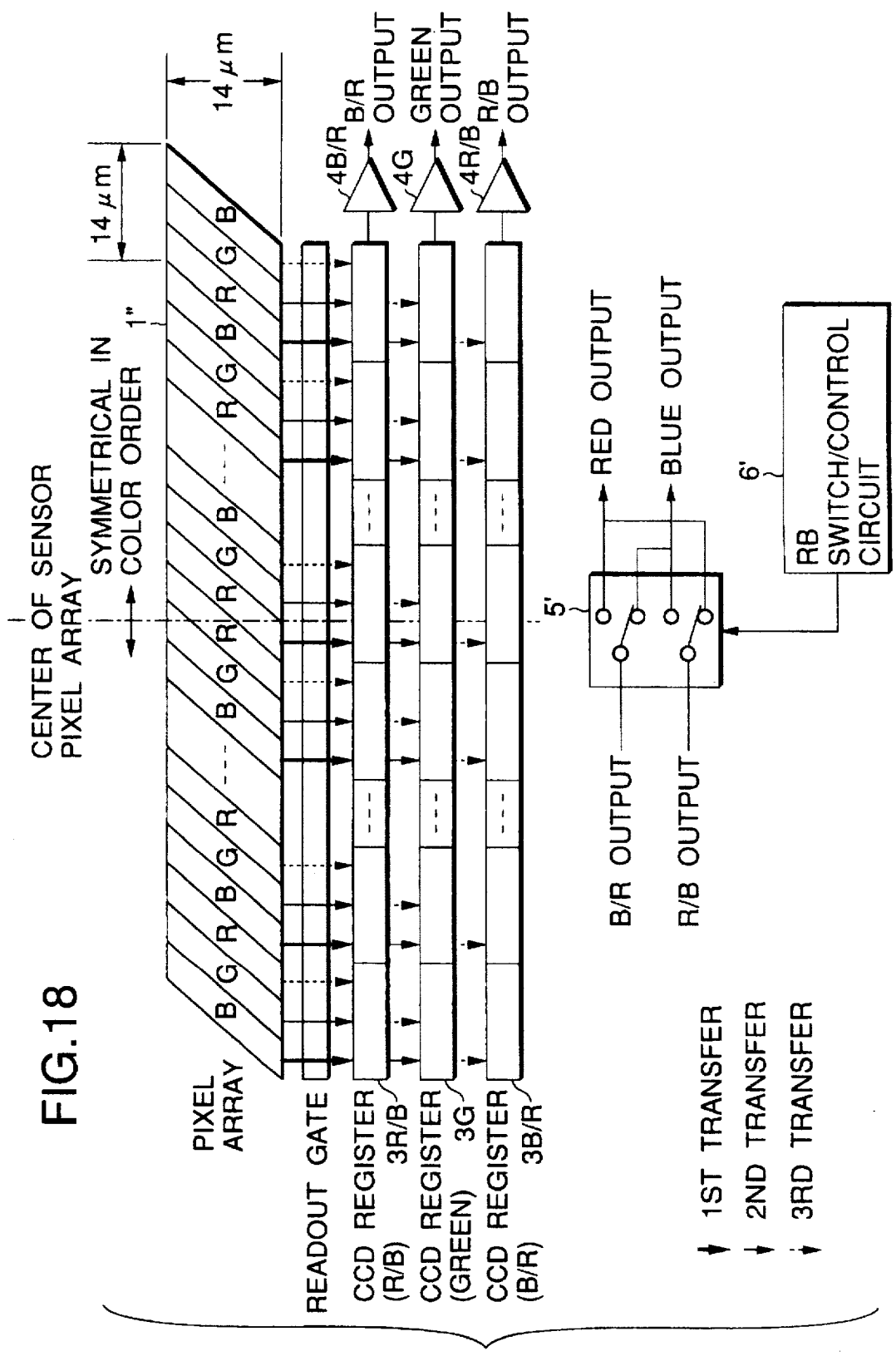
FIG. 18 is a block diagrams showing another embodiment of a color linear image sensor according to the present invention.
Figure 19:
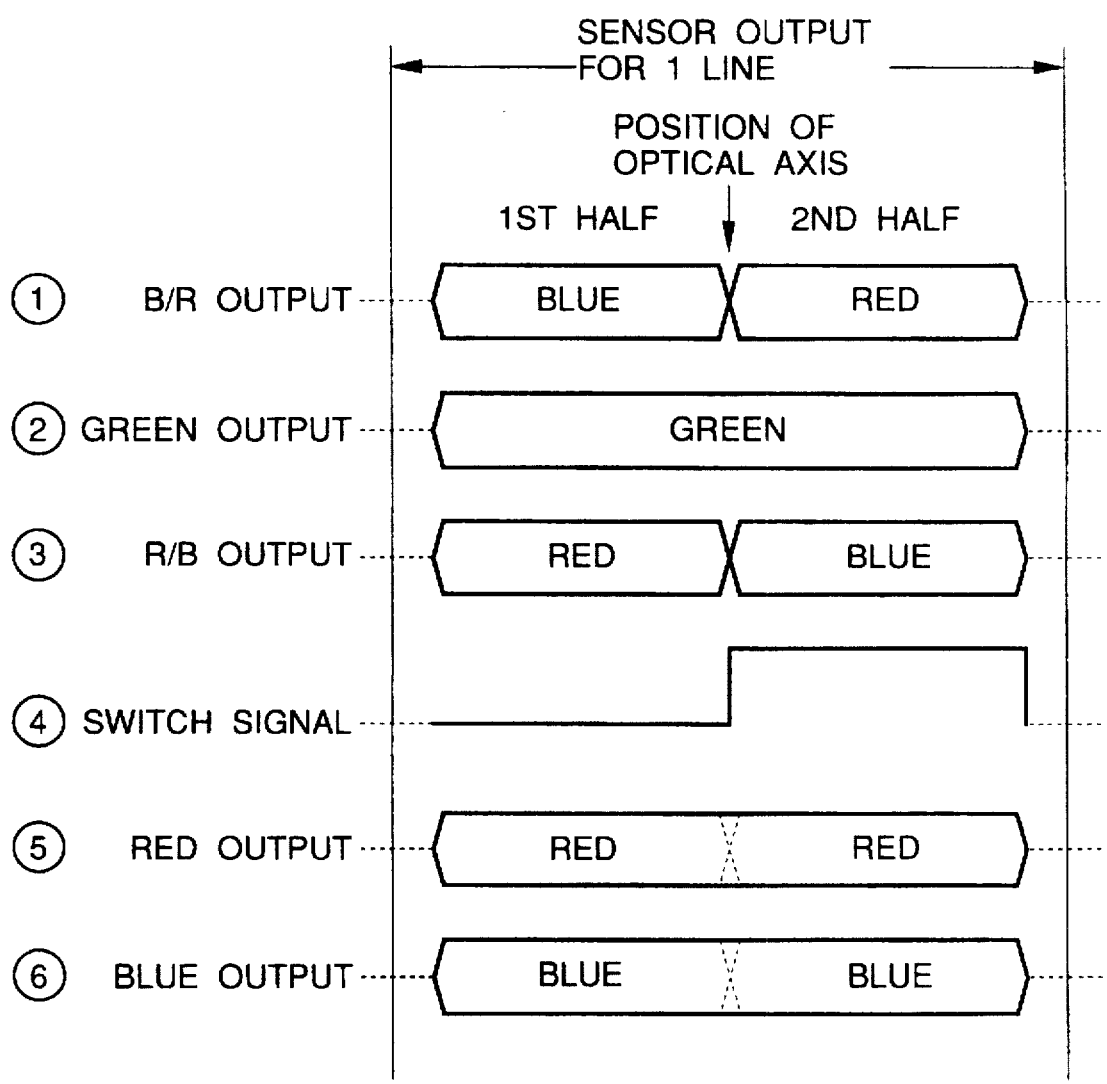
FIG. 19 is a timing diagram showing the operation of an output distribution circuit used in the color linear image sensor of FIG. 17 or 18.

FIGS. 17 and 18 are block diagrams showing other embodiments of a color linear image sensor according to the present invention. These embodiments are based on conventional black/white color image sensors providing the undercolor. FIG. 19 is a timing diagram showing the operation of an output distribution circuit used in the color linear image sensor of FIG. 17 or 18. In these figures, 1' and 1" designate sensor pixel linear arrays; 2, a readout gate; 3R/B, 3G, and 3B/R, CCD registers; 4B/R, 4G, and 4R/B, output amplifiers; 5', an output distribution circuit; and 6', an RGB switch control circuit.

Figure 25:
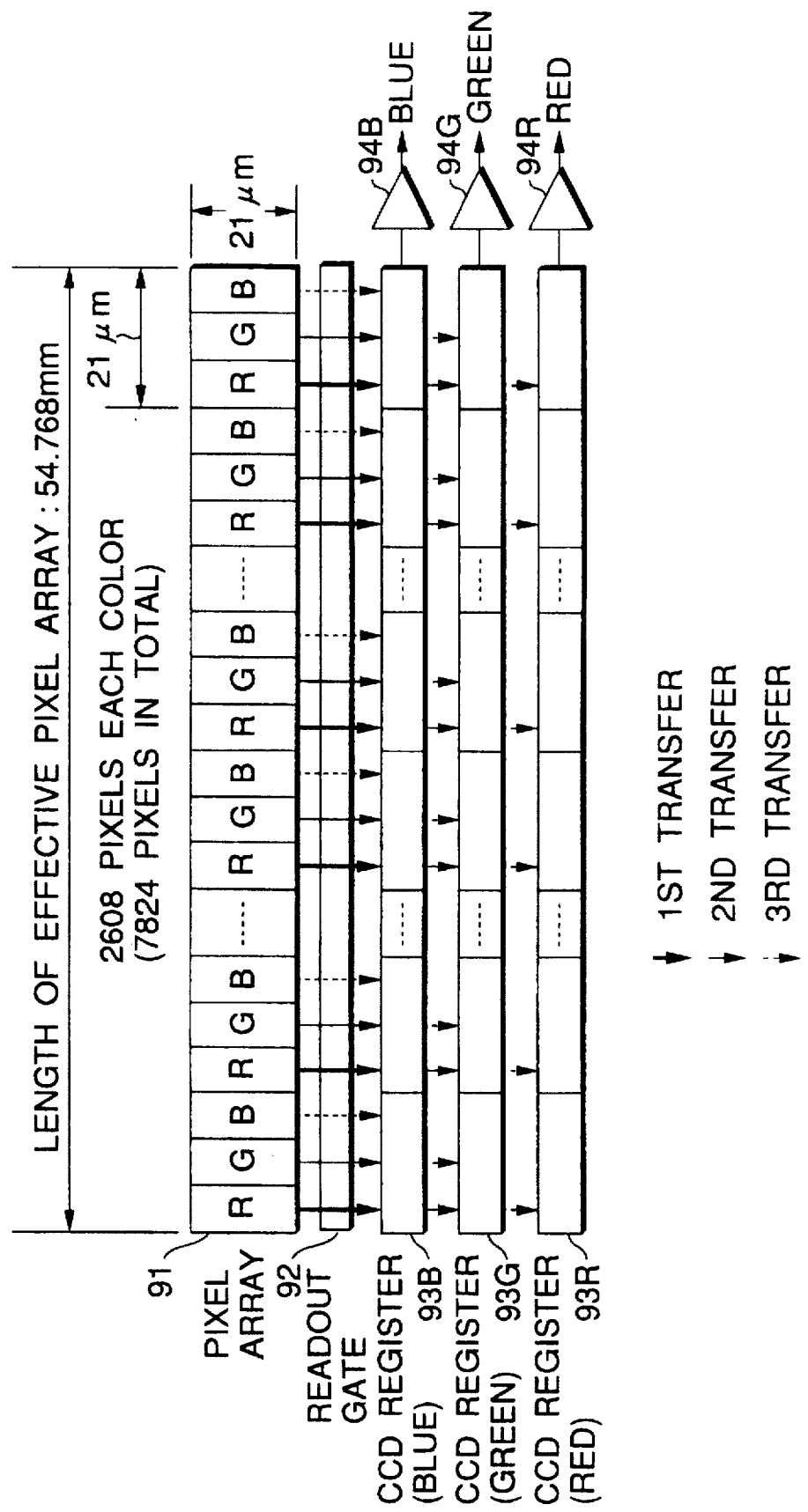
FIG. 25 is a diagram showing an arrangement of another conventional dot-sequential color linear image sensor of 1-line type.
Figure 26:
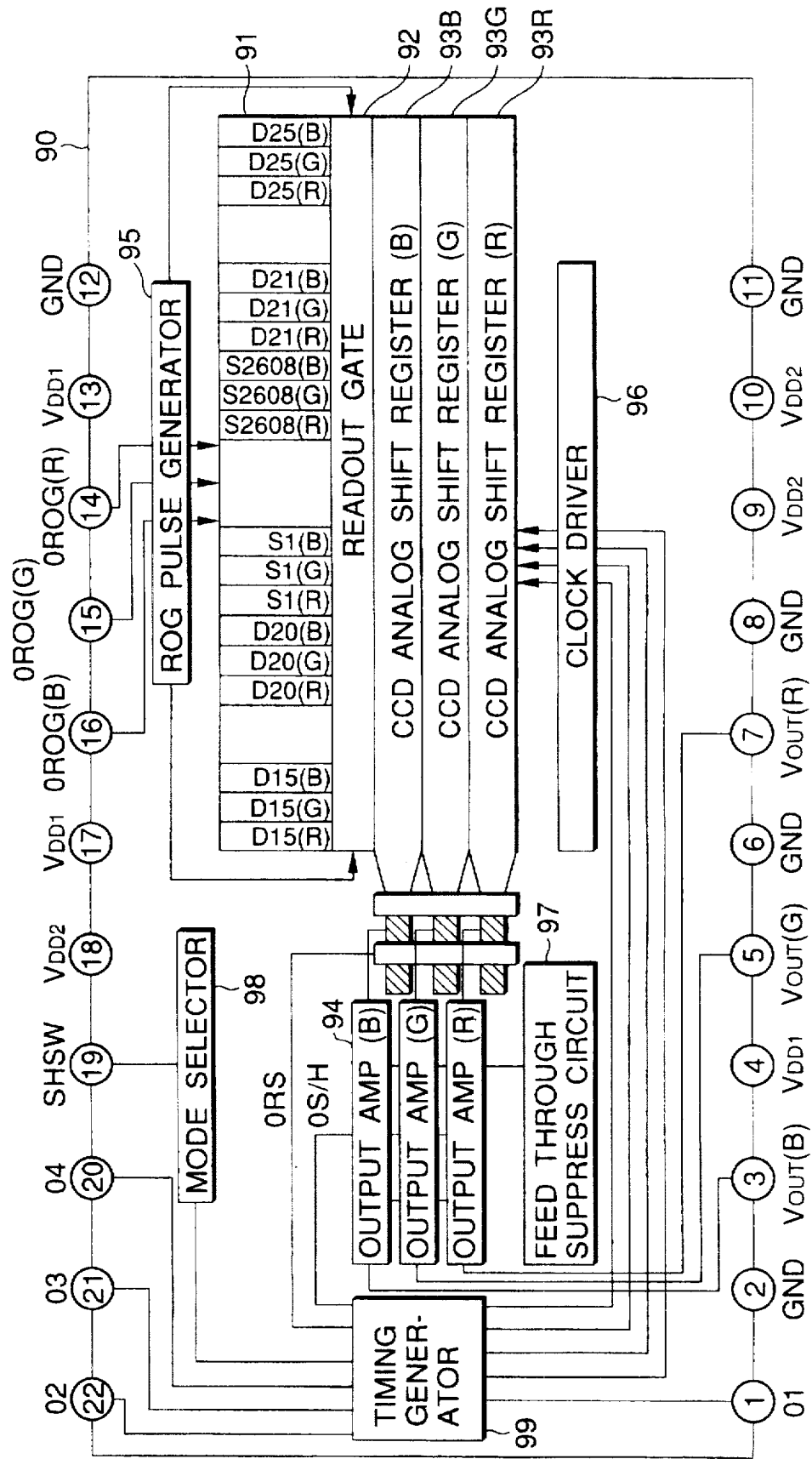
FIG. 26 is a diagram showing an arrangement of the innards of a chip of the dot-sequential 1-line color linear image sensor of FIG. 25.
Figure 27:
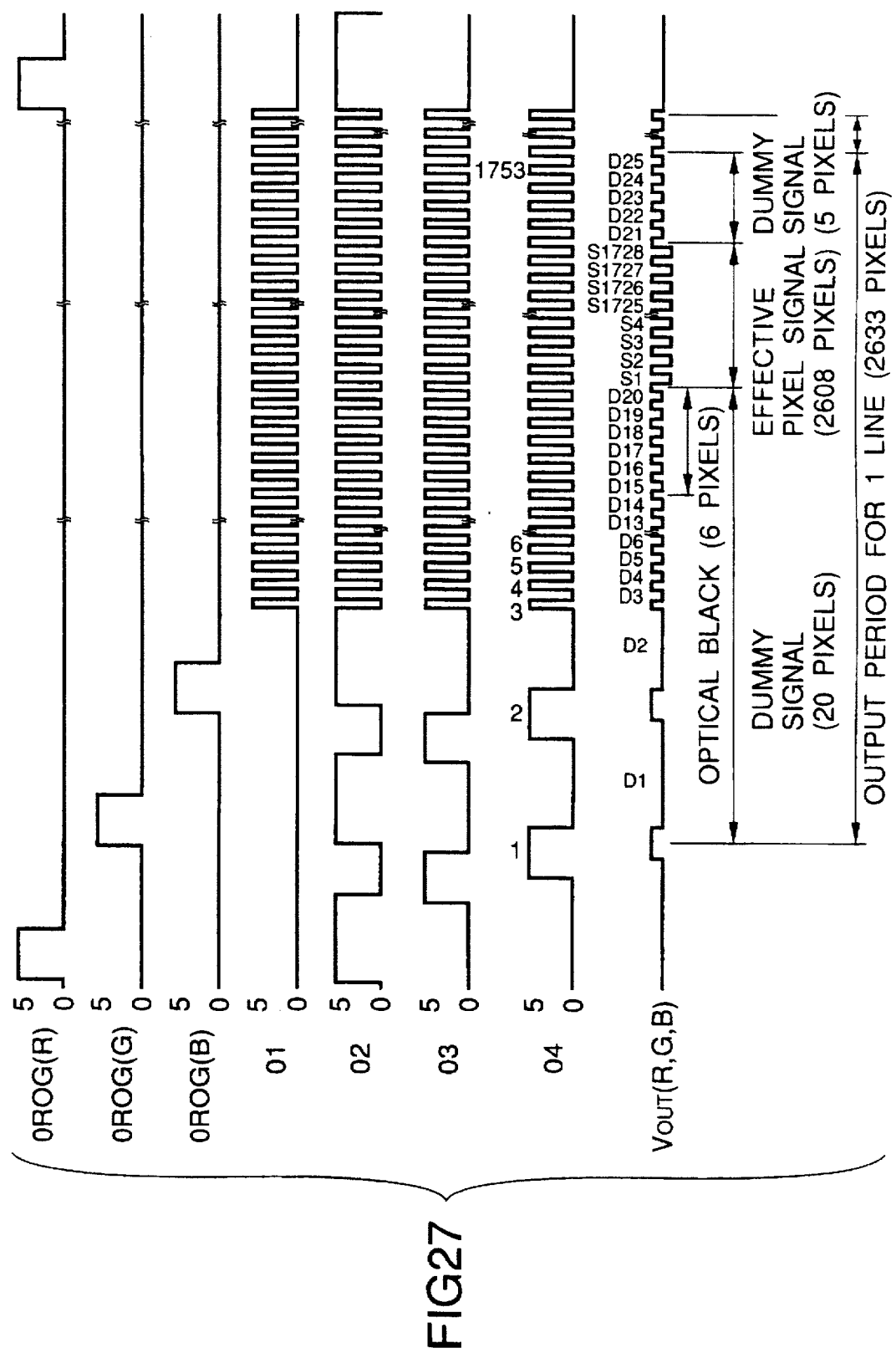
FIG. 27 is a timing chart showing an operation of the sensor chip innards arranged as shown in FIG. 26.
Figure 28:
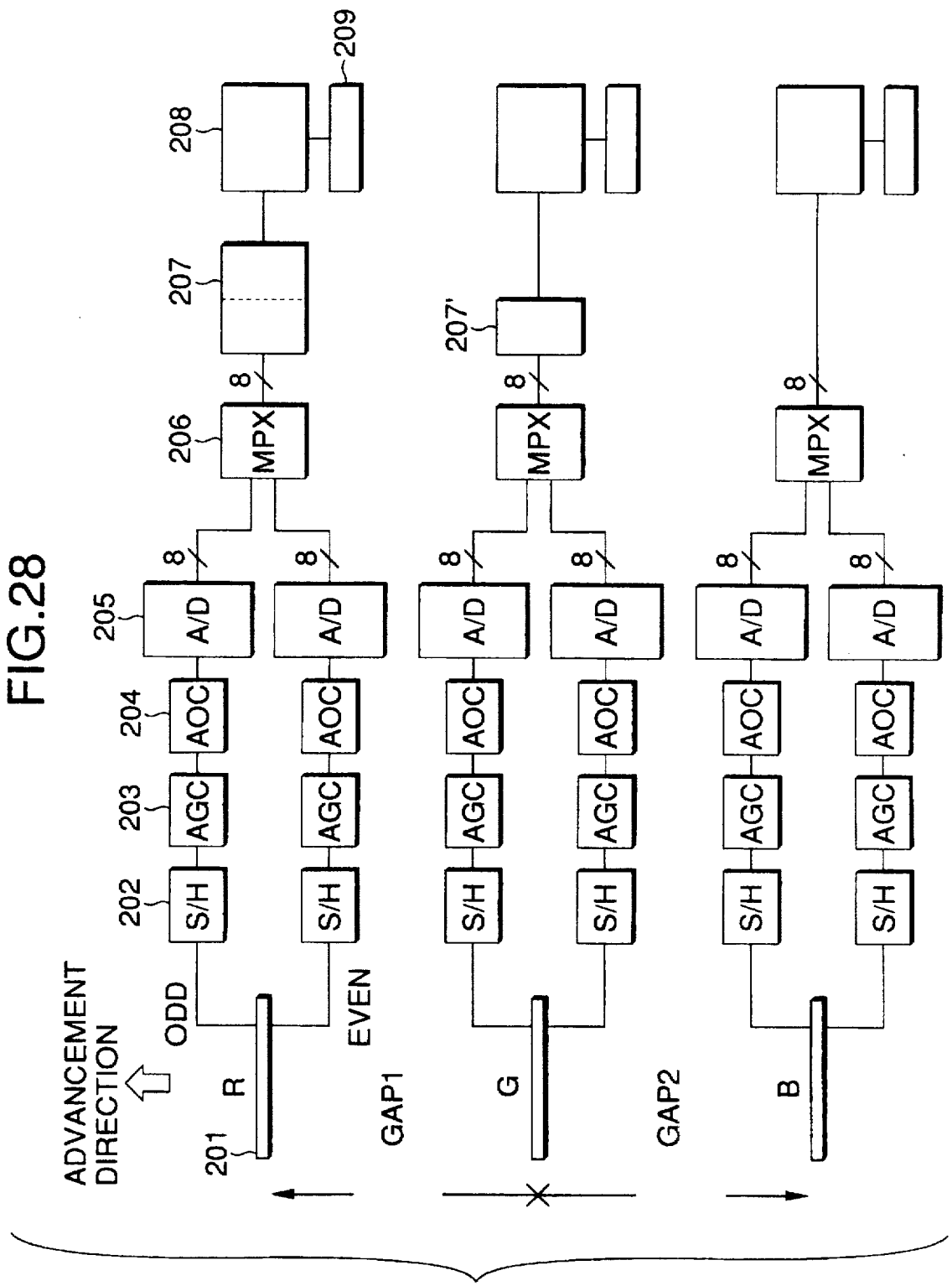
FIG. 28 is a block diagram showing an arrangement of a video signal processing circuit of a 3-line color linear image sensor.
Figure 29:
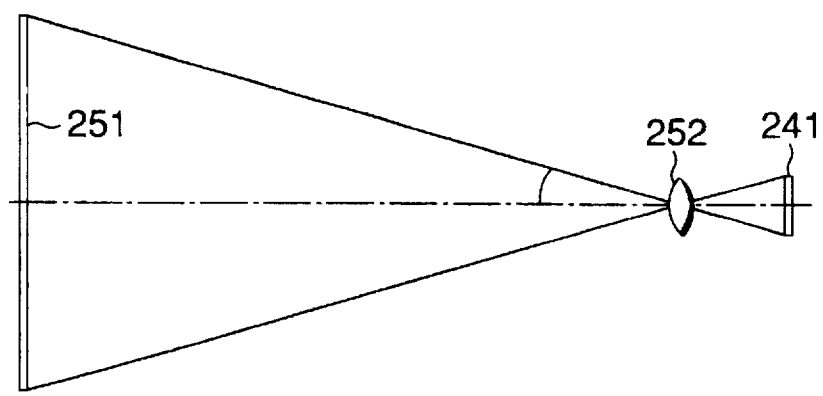
FIG. 29 is a diagram schematically showing an optical system of a document reader of the reduction type.

In the construction of the sensor pixel linear array 1' of the embodiment of FIG. 17, a black/white sensor is the same as the black/white sensor of the conventional sensor pixel linear array 91 (FIG. 25), that is, the asymmetrical black/white sensor. A color filter to be laid over the black/white sensor is symmetrically constructed. The readout gate 2, the CCD registers 3R/B, 3G, and 3B/R, and the output amplifiers 4B/R, 4G, and 4R/B are respectively the same as the readout gate 92, the CCD registers 93B, 93G, and 93R, and the output amplifiers 94B, 94G, and 94R in the color linear image sensor of FIG. 25. The output distribution circuit 5' distributes the output signals of the output amplifiers 4R/B and 4B/R to the routes of the red output signal and the blue output signal. The RGB switch control circuit 6' controls the order of the switching operations for the signal distribution. In the embodiment of FIG. 18, the slanted pixels are used for the sensor pixel linear array 1".

The output signals of the output amplifiers 4B/R, 4G, and 4R/B and the switching operation of the output distribution circuit 5' will be described. The sensor output signals of one line are illustrated in FIG. 19. The first half of the output signal of the output amplifier 4B/R when viewed with respect to the midpoint of the sensor pixel linear array, viz., the optical axis position, is blue. The second half thereof is red. The first half of the output signal of the output amplifier 4R/B is red, while the second half thereof is blue. The RGB switch control circuit 6' generates a switch signal at the optical axis position on the sensor pixel linear array. In response to the signal, the output distribution circuit 5' switches the output terminal of the output amplifier 4B/R from the B (blue) output contact to the R (red) output contact, and guides the output terminal of the output amplifier 4R/B from the R output contact to the B output contact. Thus, the output signals of the output amplifiers 4B/R and 4R/B are readily distributed into the R, G and B output routes by merely changing the connections of the output terminals of those amplifiers to the B and the R output contacts at the optical axis points.

Figure 20:
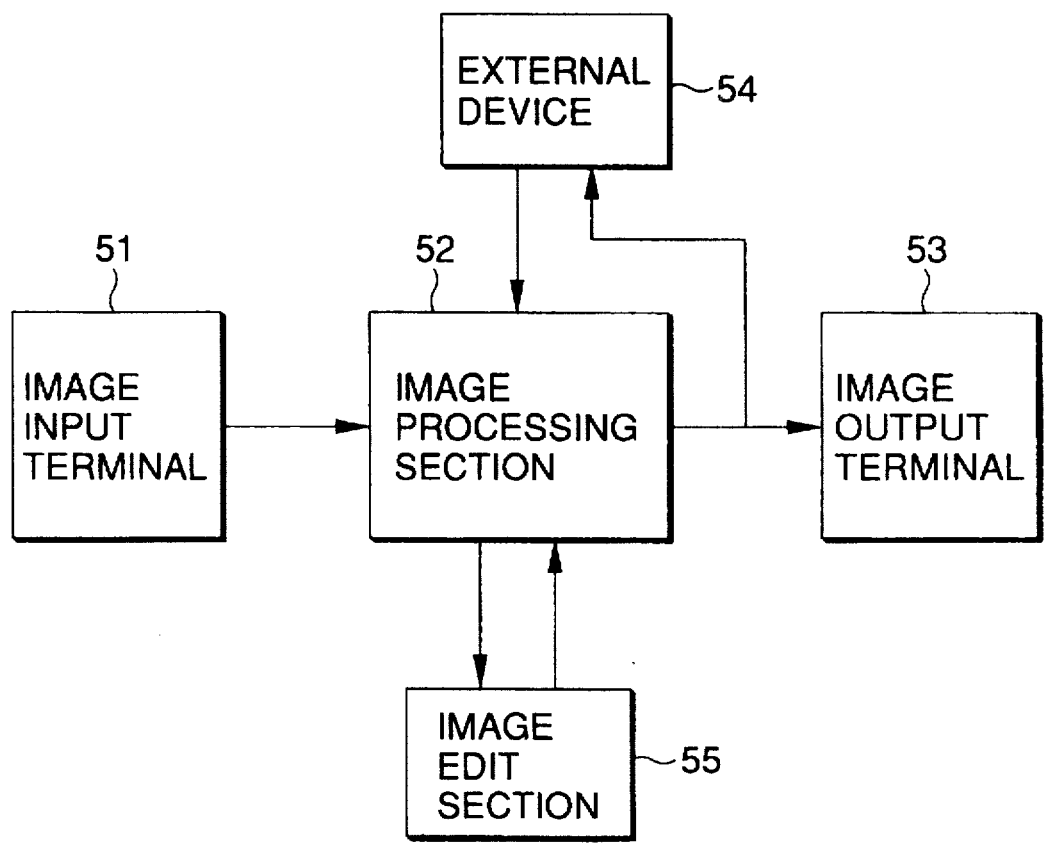
FIG. 20 is a block diagram showing an overall electrical arrangement of an image processing system.
Figure 21:
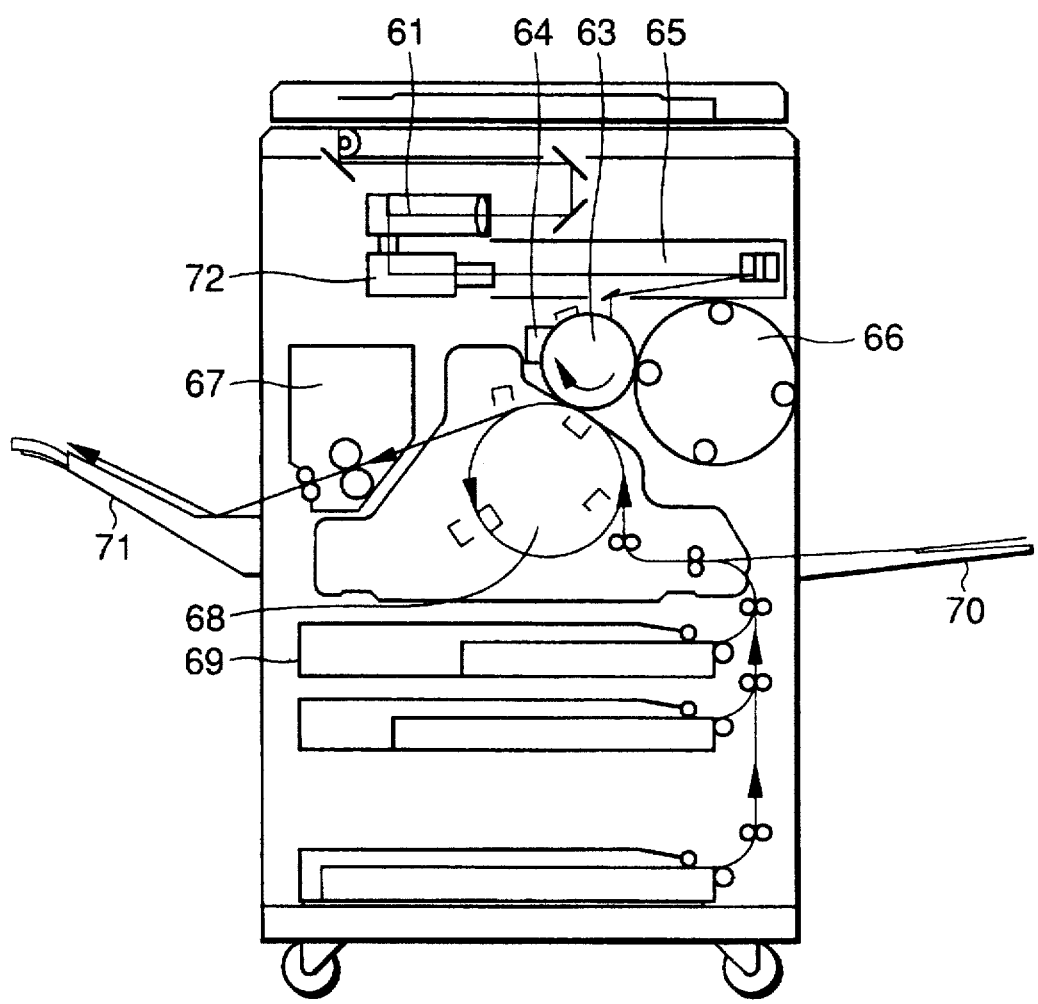
FIG. 21 is a view schematically showing a mechanical construction of the image processing system of FIG. 20.
Figure 22:
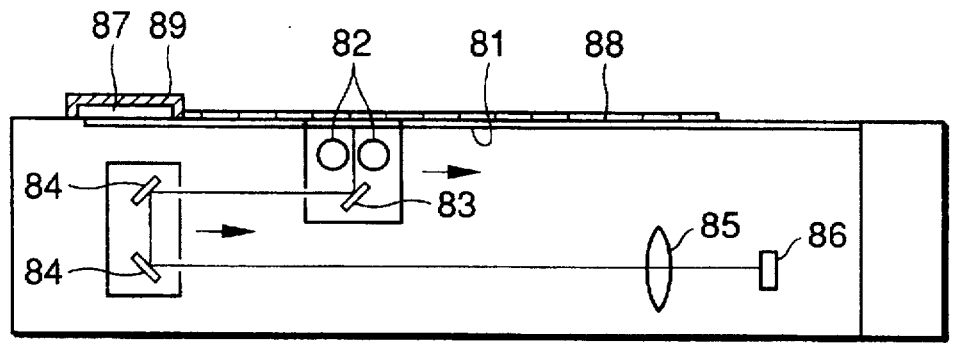
FIG. 22 is a sectional view showing an image reader section used in the image processing system.
Figure 23:
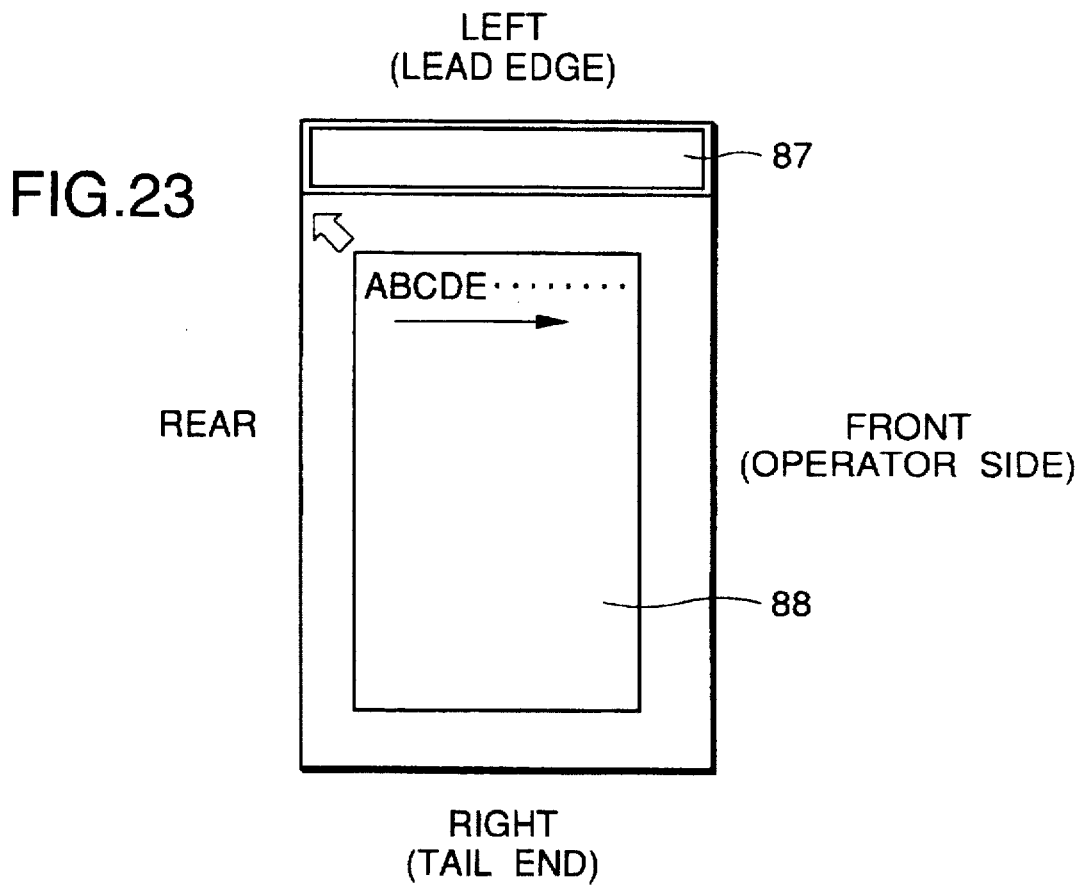
FIG. 23 is a diagram for explaining the direction of reading document readout signals by the image reader section of FIG. 22.
Figure 24A:
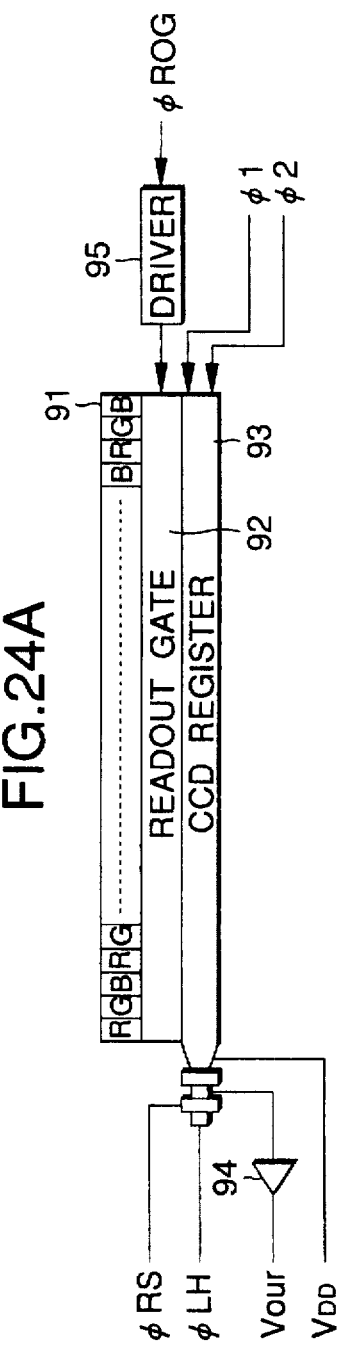
FIG. 24a and FIG. 24b are a diagram showing an arrangement of a conventional dot-sequential color linear image sensor of 1-line type.
Figure 24B:
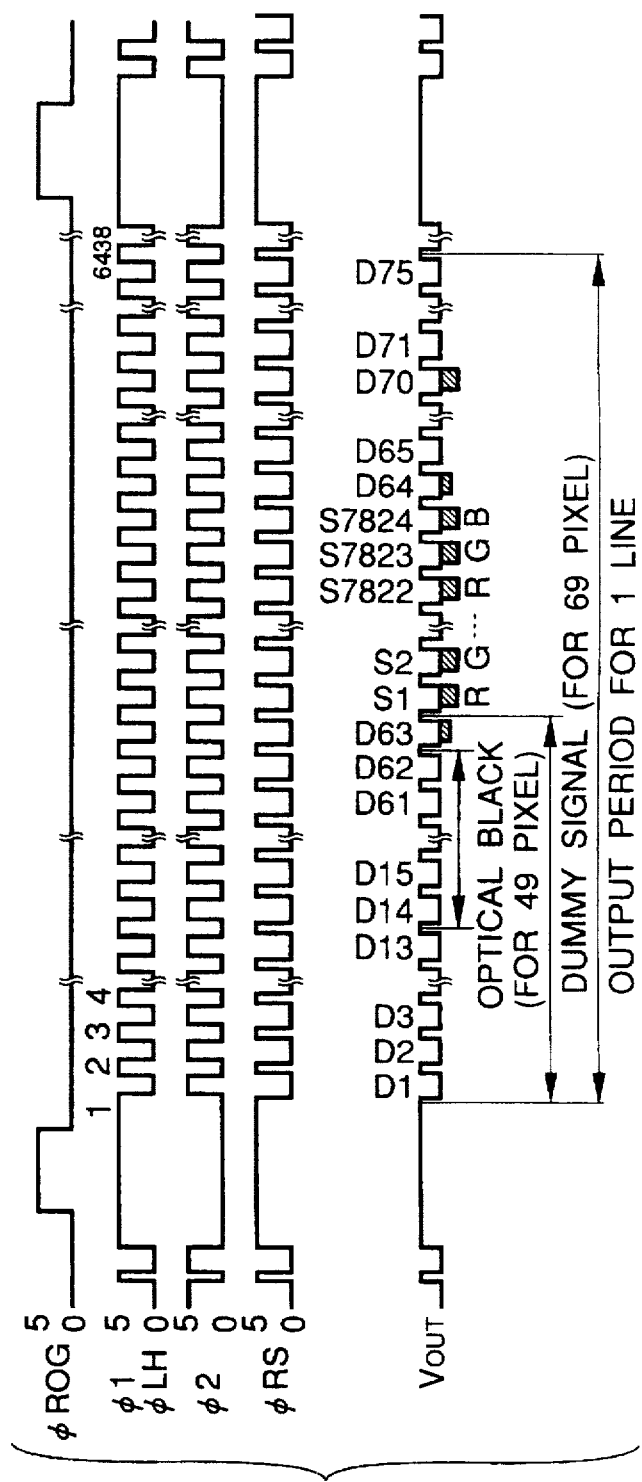

FIG. 20 is a block diagram showing an overall arrangement of an image processing system. FIG. 21 is a view schematically showing a mechanical construction of the image processing system of FIG. 20. FIG. 22 is a sectional view showing an image reader section used in the image processing system. FIG. 23 is a diagram for explaining the direction of reading document readout signals by the image reader section of FIG. 22.

The image processing system, which incorporates a color linear image sensor of the present invention, is arranged as shown in FIG. 20. As shown, the image processing system is made up of an image input terminal (IIT) (a scanner section) 51, an image processing section (IPS) 52 for processing readout signals for correction, conversion, and control, and an image output terminal (IOT) 53 which converts an image signal (electric signal) into an optical signal, forms an electrostatic latent image using the optical signal, and forms an image on the basis of the electrostatic latent image. An image edit section 55 is connected to the image processing section 52. An image signal, which is produced from an external device 54, such as a personal computer with a scanner, a work station, and a facsimile machine, is applied to the image processing section 52. An image signal, which is outputted from the image processing section 52, is also applied to the external device 54. The mechanical construction of the image processing system and the construction of the image reader section are schematically illustrated in FIGS. 21 and 22, respectively.

The image input terminal 51 is based on a reduction optical system, which includes a lighting device 82, e.g., a fluorescent lamp or a halogen lamp, reflecting mirrors 83 and 84, and an optical lens 85. The image input terminal 51 uses a RGB 3-line type CCD sensor 61 of 5,000 pixels. A signal read out by the CCD sensor 61 is amplified by an analog amplifier, and converted into a digital signal by an A/D converter. A control board 72 contains the electric circuitry of the image processing section 52 and the image output terminal 53. The image processing section 52 variously processes the RGB digital signals of, for example, 8 bits, derived from the scanner, and generates CMYBk signals in conformity with the characteristics of the image output terminal 53. The image output terminal 53 applies the CMYBk signals, which successively come in from the image processing section 52, to a laser driver for controlling the on-off operations of a semiconductor laser device. A ROS (raster output scanner; laser beam scanner) 65, which is constructed with an infrared-rays semiconductor laser, scans the surface of a drum 63 as a photoreceptor with a laser beam of 60 µm in spot diameter. An electrostatic latent image is depicted on the surface of the photoreceptor drum 63 with a laser beam containing image information. The latent image is developed into a visual image by a developing process using a two-component developer that is carried out by a rotary developing unit 66. The developed image is transferred onto a print sheet attractively held on a transferring drum. The toner left on the surface of the photoreceptor drum 63 is removed by a cleaner 64. This process is repeated in the order of Bk, Y, M, and C, so that color toner images are superposedly transferred onto the print sheet. The print sheet with the transferred color toner image is peeled off the transfer drum and the toner image is fixed thereon.

An original document 88 is put on a document table 81, while being faced downward (FIG. 22). Light irradiates the original document 88 in the lighting device 82. Light is reflected on the original document 88, and by reflecting mirrors 83 and 84, and is focussed on the linear CCD sensor 86 through an optical lens 85. The linear CCD sensor 86 reads out image information from the original document 88 in the fast scan direction. The linear CCD sensor 86 converts the readout image information into electrical signals. The lighting device 82, and the reflecting mirrors 83 and 84 are driven by a motor drive system (not shown) to move in the direction of an arrow and to scan the document table 81. By the scan, image information is read out of the original document 88 in the slow scan direction. In this way, the linear CCD sensor 86 reads out image information from the original document 88 and produces the result in the form of electrical signals.

In the image reader section of FIG. 22, the lighting device 82 suffers from illumination irregularity, the reflecting mirrors 83 and 84 cause density irregularity because of soil on them, the optical lens 85 suffers from light distribution irregularity. To remove those irregularities, a shading correction means is used. That is, a white reference board 87 is provided at the slow-scan start point of the document table 81. The white reference board 87, shaped like a plate, serves as a density reference board which generates a reference signal for the image signal correction. The front face of the white reference board 87 is entirely covered with a white coating. The white reference board 87 is extended in the fast scan direction as shown in FIG. 23. The original document 88 illustrated in FIG. 23 is viewed from the underside of the document table 81. In the figure, the right side corresponds to the front side of the machine from where an operator makes an access to the machine for operation; the left side corresponds to the rear side of the machine; and the upper side corresponds to the left side of the machine when seen from the front side of the machine. In FIG. 23, the original document 88 is scanned from left to right for the fast scan, and from top to bottom for the slow scan. Before the original document 88 is scanned, information is read out of the white reference board 87. Then, the original document 88 is scanned, and the readout image signals are corrected using the readout signal from the white reference board 87. Reference numeral 89 designates a cover/positioning guide for covering the white reference board 87 and positioning the document.

The BGR signals are outputted in the form of 8-bit data (256 tone levels) from the image input terminal 51, and inputted to the image processing section 52. In the image processing section 52, the BGR signals are converter into CMYBk signals (toner signals). A toner signal X of the process color is selected. The toner signal is converted into binary signals, or the on/off data of the toner signal of the process color, and the converted one is outputted to the image output terminal 53. During the operation, the image processing section 52 variously process the received image data for improving the color, tone and definition reproduction performances. Examples of the various data processings are the equivalent neutral density conversion for converting the document readout signals into gray-balanced color signals, the matrix conversion for converting the BGR signals into YMC signals, the color conversion converting the color in a specific area into a designated color, the UCR (under color removal)/black generation process for generating a proper amount of black Bk and equally reducing the amounts of the colors of Y, M and C in accordance with the Bk amount in order to keep color purity, the smoothing process for the document of photograph, print or the like and the edge emphasis process for the document of character and line, the smoothing process and the edge emphasis process being carried out on the basis of the dot removal information and the edge emphasis information that are generated using the digital filter and the modulation table. The image processing section 52 further has various edit functions for improving the reproduction performances. Examples of the edit functions are the density control using an area signal, contrast control, negative-to-positive inversion, color balance control, character mode, watermark composition, and the like. The image processing section 52 employs L*a*b* signals including the value as the system value and hue information, and makes the color conversion of BGR→L*a*b*.

It should be understood to those skilled persons in the art that the present invention is not limited to the abovementioned embodiments, but may variously be modified, altered and changed within the scope of the present invention. In the above-mentioned embodiments, the invention is applied to a color linear image sensor of three colors, R, G and B, but it may be applied to a color linear image sensor of two colors, for example, red and cyan, and also to an RGB+IR sensor. The shape of the pixel may be any other shape than the rectangle. In the sensor pixel linear array, colors are arranged in the order of B, G and R from outside in conformity with the fundamental characteristics of the lens. The order of the arranged pixels may be properly changed taking the lens characteristics and others into consideration. Where the pixels are symmetrically arranged in their order in the sensor pixel linear array, the pixels are arranged as . . . BGRRGB . . . in the portion where the pixel order is inverted. Two Rs are successively arranged, and Bs are spaced at the pitch two times as large as the normal one. In this case, when the luminance signal is generated from the BGR signals, the signals are preferably composed at the ratio of colors; R:G:B=2:7:1. Green G mainly defines the definition information of black fine lines. Then, to prevent a discontinuity, it is preferable to locate the green G at the center of the color trio.

As seen from the foregoing description, in the color linear image sensor of the present invention, the sensor pixel linear array is constructed such the pixels linearly arrayed are symmetrical in their order with respect to the midpoint of the pixel array. Therefore, the matching of the color displacement among the R, G and B colors, which is caused by the sensor structure, with the chromatic aberration of magnification, which is inherent to the lens, reduces the quantity of the total color displacement. Further, if the color linear image sensor is constructed such that the black/white CCD sensor providing the undercolor is used while being asymmetrical as the conventional sensor, and only the color filter is symmetrical, the readout image signals can readily be distributed into the R, G and B signal routes by the output distribution circuit.

The foregoing description of the preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A color linear image sensor comprising:
    a sensor pixel linear array with a plural number of color filters laid and bonded thereover, the sensor pixel linear array consisting of repeat patterns of color pixels linearly arrayed in a preset color order, the repeat patterns being symmetrical with respect to the midpoint of the sensor pixel linear array;
    a readout circuit for reading out image signals line by line from the sensor pixel linear array; and
    an output processing circuit for distributing the readout signals into a plural number of color image signal routes, the output processing circuit outputting the readout signals of separated colors.

2. The color linear image sensor according to claim 1, wherein the order of the colors of the pixels in the sensor pixel linear array is made to match with the lens characteristic of the chromatic aberration of magnification, whereby minimizing the quantity of the color displacement in the fast scan direction.

3. The color linear image sensor according to claim 1, wherein the color pixels of the sensor pixel linear array are arranged in the order of R (red), G (green) and B (blue) from the midpoint of the sensor pixel linear array toward the outside thereof.

4. The color linear image sensor according to claim 3, wherein the color of G is located at the center of the trio of colors R, G and B in the sensor pixel linear array.

5. The color linear image sensor according to claim 1, wherein only the color filters are symmetrically arranged for the sensor pixel linear array.

6. The color linear image sensor according to claim 1, wherein for the sensor pixel linear array, a couple of sensor chips including the pixels arrayed in the same color order, are arranged linearly and side by side in a state that one chip is turned 180° with respect to the other chip.

7. The color linear image sensor according to claim 1, wherein the output distribution circuit distributes the output signals of the readout circuit in accordance with the order of the colors arranged of the filters.

8. In an image processing system having an optical system for projecting an image on an original document onto a color linear image sensor, the color linear image sensor for reading the image projected thereon in the form of color image signals of separated colors, and a signal processing circuit for processing the separated color image signals received from the color linear image sensor,
    the color linear image sensor comprising:
    a sensor pixel linear array with a plural number of color filters laid and bonded thereover, the sensor pixel linear array consisting of repeat patterns of color pixels linearly arrayed in a preset color order, the repeat patterns being symmetrical with respect to the midpoint of the sensor pixel linear array;
    a readout circuit for reading out image signals line by line from the sensor pixel linear array; and
    an output processing circuit for distributing the readout signals into a plural number of color image signal routes, the output processing circuit outputting the readout signals of separated colors.

9. The color linear image sensor according to claim 8, wherein in the color linear image sensor, the midpoint of the sensor pixel linear array is coincident with the optical axis of a lens of the optical system.

10. The color linear image sensor according to claim 8, wherein the order of the colors of the pixels in the sensor pixel linear array is made to match with the lens characteristic of the chromatic aberration of magnification, whereby minimizing the quantity of the color displacement in the fast scan direction.

11. The color linear image sensor according to claim 8, wherein the color pixels of the sensor pixel linear array are arranged in the order of R (red), G (green) and B (blue) from the midpoint of the sensor pixel linear array toward the outside thereof.

12. The color linear image sensor according to claim 11, wherein the color of G is located at the center of the trio of colors R, G and B in the sensor pixel linear array.

13. The color linear image sensor according to claim 8, wherein only the color filters are symmetrically arranged for the sensor pixel linear array.

14. The color linear image sensor according to claim 8, wherein for the sensor pixel linear array, a couple of sensor chips including the pixels arrayed in the same color order, are arranged linearly and side by side in a state that one chip is turned 180° with respect to the other chip.

15. The color linear image sensor according to claim 8, wherein the output distribution circuit distributes the output signals of the readout circuit in accordance with the order of the colors arranged of the filters.

* * * * *